United States Patent [19]

Watanabe et al.

[11] Patent Number: 5,319,390
[45] Date of Patent: Jun. 7, 1994

[54] THERMAL PRINTER APPARATUS

[75] Inventors: Sumio Watanabe; Shuko Yamaji; Katsuhiro Maeda, all of Kawasaki, Japan

[73] Assignee: Fujitsu Limited, Kawasaki, Japan

[21] Appl. No.: 766,135

[22] Filed: Sep. 27, 1991

[30] Foreign Application Priority Data

Sep. 28, 1990 [JP] Japan .................. 2-262727
Sep. 28, 1990 [JP] Japan .................. 2-262728

[51] Int. Cl.⁵ .................................... B41J 2/36
[52] U.S. Cl. .................................... 346/76 PH
[58] Field of Search ............ 346/76 PH; 400/120

[56] References Cited

U.S. PATENT DOCUMENTS

| | | | |
|---|---|---|---|
| 4,140,022 | 2/1979 | Maslak | 73/626 |
| 4,224,829 | 9/1980 | Kawabuchi et al. | 73/626 |
| 4,389,935 | 6/1983 | Arai | 101/93.01 |
| 4,516,137 | 5/1985 | Yasui | 346/76 PH |
| 4,638,329 | 1/1987 | Nakayama et al. | 346/76 PH |
| 4,699,009 | 10/1987 | Maslak | 73/626 |
| 4,707,813 | 11/1987 | Moeller et al. | 367/103 |
| 4,751,520 | 6/1988 | Mizuguchi | 346/76 PH |
| 4,814,790 | 3/1989 | Nitta | 346/76 PH |
| 4,875,056 | 10/1989 | Ono | 346/76 PH |
| 4,949,097 | 8/1990 | Imaseki | 346/76 PH |
| 5,072,237 | 12/1991 | Takaoka | 346/76 PH |

FOREIGN PATENT DOCUMENTS

| | | |
|---|---|---|
| 0254454 | 1/1988 | European Pat. Off. . |
| 0034412 | 3/1978 | Japan . |
| 0044371 | 3/1985 | Japan .................. 346/76 PH |
| 0168669 | 9/1985 | Japan .................. 400/120 |

OTHER PUBLICATIONS

*Patent Abstracts of Japan,* vol. 12, No. 190 (M-704)(3037) Jun. 3, 1988 & JP-A-62 299350 (Fujitsu Ltd) 26 Dec. 1987.

*Patent Abstracts of Japan,* vol. 15, No. 290 (M-1139) Jul. 23, 1991 & JP-A-3 104660 (Fujitsu Ltd) May 1, 1991.

*Primary Examiner*—Benjamin R. Fuller
*Assistant Examiner*—N. Le
*Attorney, Agent, or Firm*—Staas & Halsey

[57] ABSTRACT

An object of this invention is to present a thermal printer for printing at high speed the data with the drive at a low voltage of around 5 V while preventing the printing problems attributable to the voltage drop due to internal impedance and to the loss inside the head coming from the common conductor inside the head. The thermal printer has a plurality of heating elements.

The thermal printer comprises a print head consisting of the print blocks which have divided the heating elements at every stipulated quantity and a heating means for electrically heating the heating elements on the basis of the stipulated data at every print block wherein the heating means has been structured to simultaneously heat the heating elements against a plurality of print blocks to color the thermosensitive paper in contact with the heating elements of the print block.

15 Claims, 21 Drawing Sheets

T ( α, β )

α: THE αTH PULSE

β: THE PRINT BLOCK OF THE βTH GROUP

THE ASTERISK ∎ MARK DENOTES THE ELECTRIFICATION OF DOT LINE AT A STEP AHEAD OF IT $T(\alpha, \beta)$ $\alpha$: THE $\alpha$TH PULSE $\beta$: THE PRINT BLOCK OF THE $\beta$TH GROUP THE ASTERISK * MARK DENOTES THE ELECTRIFICATION OF DOT LINE AT A STEP AHEAD OF IT

T ( α, β )

α : THE α TH PULSE

β : THE PRINT BOCK OF THE β TH GROUP

THE ASTERISK * MARK DENOTES THE ELECTRIFICATION OF DOT LINE AT A STEP AHEAD OF IT

Fig. 12

|   | HIGH SPEED PRINTING MODE | HIGH QUALITY PRINTING MODE |
|---|---|---|
| 1 | 75% | 50% |
| 2 | **% | **% |
| 3 | **% | **% |
| 4 | **% | **% |

PRINT SPEED

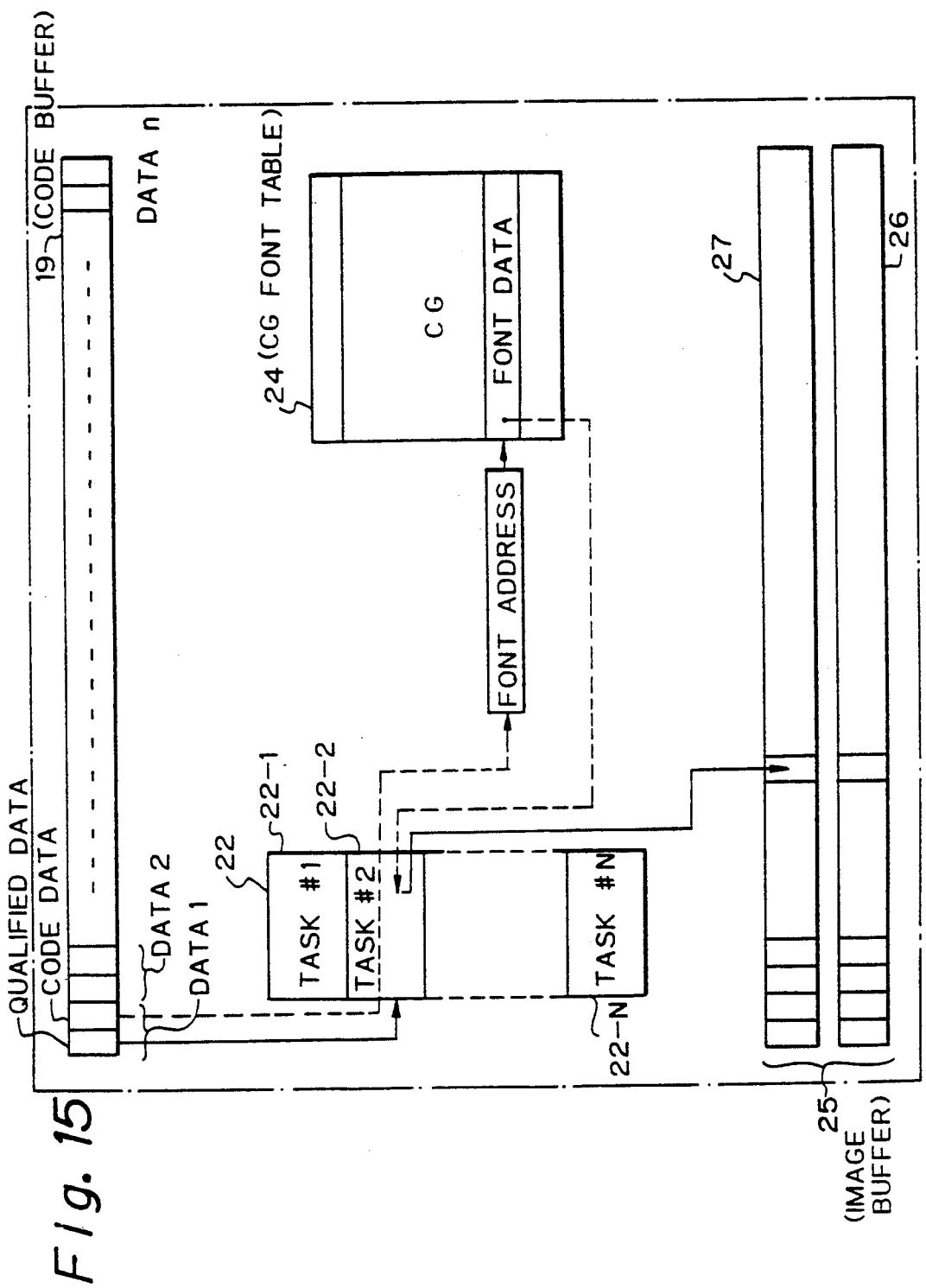

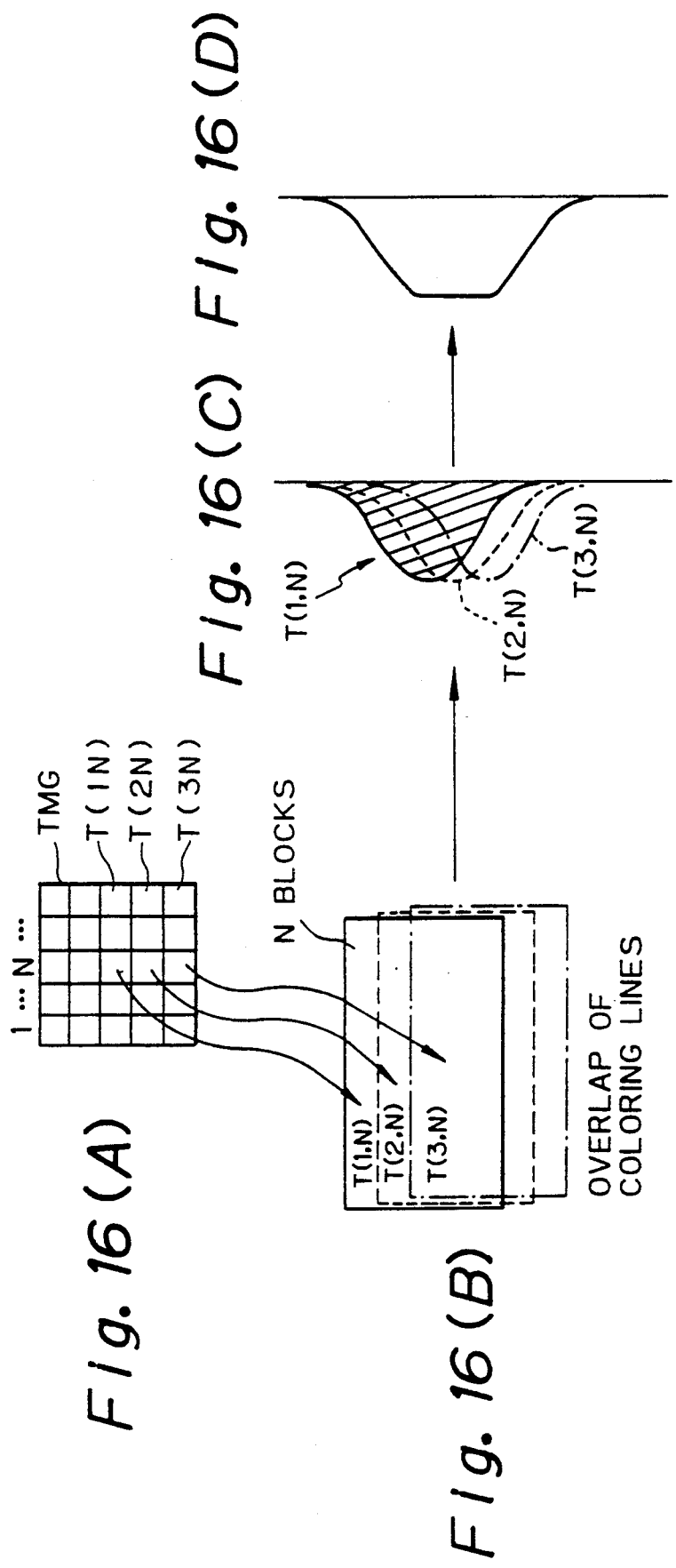

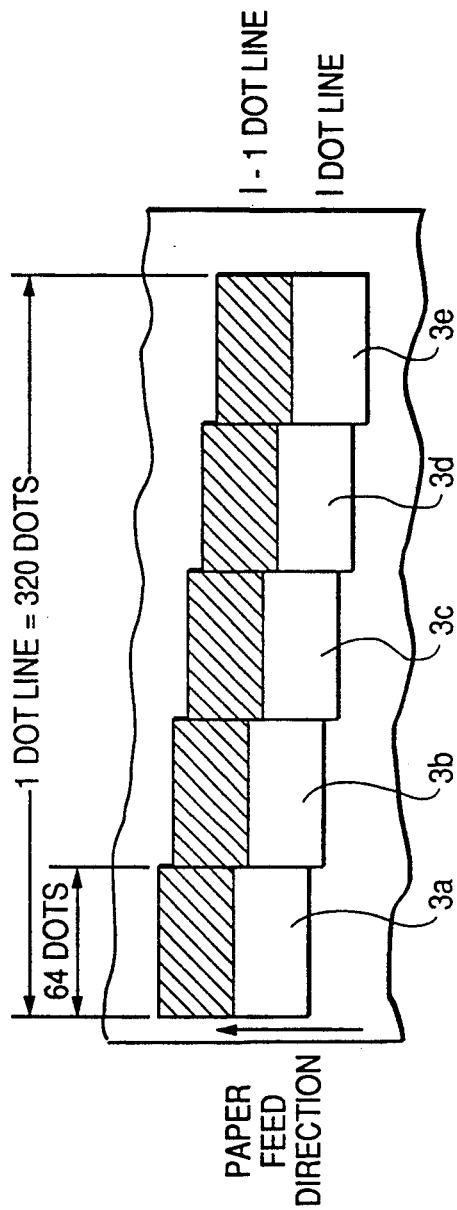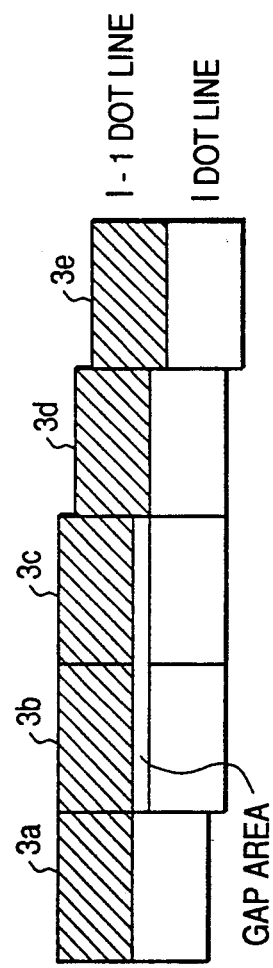

2-BURN SYSTEM

3-BURN SYSTEM

THE 1ST TIMING
THE 2ND TIMING
THE 3RD TIMING t1 AND t2 : PRINT TIME OF 1 DOT LINE

Fig. 21

| | | | | | |
|---|---|---|---|---|---|
| $G_0^0$ | O | O | O | $G_4^1$ | T-1 |
| $G_0^1$ | $G_1^0$ | O | O | O | T-2 |
| O | $G_1^1$ | $G_2^0$ | O | O | T-3 |
| O | O | $G_2^1$ | $G_3^0$ | O | T-4 |
| O | O | O | $G_3^1$ | $G_4^0$ | T-5 |

ELECTRIFICATION TIMING ↓

GROUPING OF 1 DOT LINE →

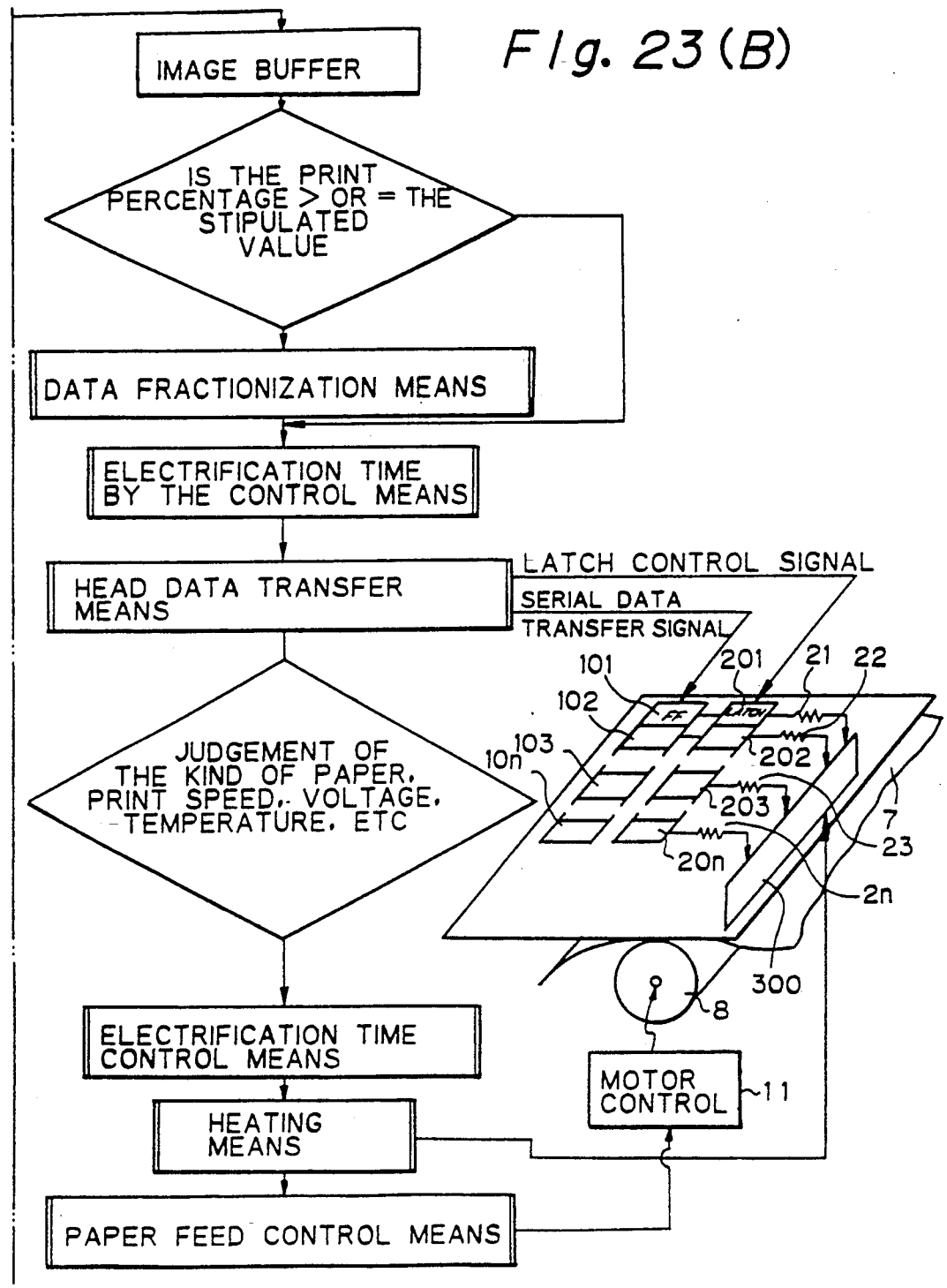

THERMAL PRINTER APPARATUS

BACKGROUND OF THE INVENTION

1. Field of the Invention

The present invention relates to a line thermal printer, and in particular relates to a line thermal printer which is suitable, for example, to be used with a terminal etc. and which is to be connected to a compact type portable equipment driven by batteries, for example.

2. Description of the Related Art

In recent years, a number of so called thermal printers have been developed, which print by electrically heating the print head corresponding to the letters and graphics on to a thermosensitive paper which develops colors if heat is sensed.

These thermal printers, especially a thermal printer driven by batteries are roughly classified into 2 groups, (1) a serial thermal printer of a low voltage system (about 5 V), and (2) a line thermal printer of a high voltage system (about 12 V) and generally, a thermal printer working with a low voltage is slow in print speed while a thermal printer high in print speed requires a high voltage.

In other words, compact portable equipment, for example, a terminal and the like can not print at a high speed because the equipment is driven by a battery in the order of 4.5 to 6.5 V or with a low voltage in a 5 V single power source.

Therefore, a line thermal printer that can be operated with a low voltage, for example, around 5 V is required.

On the other hand, there exist a variety of thermosensitive papers being used with this thermal printer, such as red/black paper the color of which changes, for example of example, different temperatures are sensed, or different print energies, are given and a 2-ply paper is sensed. A 2-ply paper does not develop colors unless a greater print energy is provided than the usual print energy, which makes a 1-ply thermosensitive paper.

Consequently, in order to obtain favorable print quality for a variety of thermosensitive papers, a line thermal printer is necessary that can change the print energy per unit area in accordance with the thermosensitive papers to be used.

In the past, a line thermal printer as shown in FIG. 1, for example, is available as this type of thermal printer.

The print head 1 of this line thermal printer is structured of 4 print blocks, 3a to 3d, whose heating element 2 of 320 dots per dot line has been divided at every 80 dots.

In the aforesaid structure, if the printing is made on a given thermosensitive paper, the heating element 2 in the print block 3a is electrified for a stipulated time, for example, with a high voltage of around 12 V, first based on the stipulated data, the printing is made at the thermosensitive paper position (shaded area (1)) corresponding to the print block 3a as shown in FIG. 2, and then the paper is fed out very slightly.

Thereafter, the heating elements 2 in the print blocks 3b, 3c and 3d are sequentially electrified in a similar way, the printing is made on the thermosensitive paper positions (shaded areas (2), (3) and (4)) corresponding to the print blocks 3b, 3c and 3d, and thus the printing of 1 dot line is ended.

However, this type of conventional line thermal printer has been structured such that the printer is electrified for the stipulated time with a high voltage of around 12 V, so if the printing has been made at every line with a low voltage, for example, from 4.8 V to 5.0 V, there is the problematic point that a favorable print quality or print density can not be obtained and the printing can not be made at a high speed as a result because the print energy is small. This is because, compact portable a terminal and like, for example, need to be driven by a low voltage, or by a single power source of around 4.8 V. Sufficient print energy can not be produced with this type of low voltage.

In addition, there is the problematic point that the printing can not be made at a high speed with the drive at a low voltage.

In other words, to obtain the necessary to color the thermosensitive paper with a low voltage, the resistance value needs to be made lower and the current value needs to be made larger, but in general, the energy needed for printing is expressed by the following formula:

$$\epsilon = \frac{(V - Vs)^2}{R} \cdot t/S$$

where
$\epsilon$ = Energy per unit area.
v: Impressed voltage.
Vs: Saturation voltage.
R: Heating element resistance value.
t: Pulse width.
S: Heating element area,
and for enlarging the print energy, (1) the saturation voltage "Vs" must be made smaller, (2) the heating element resistance value "R" must be made smaller, (3) the heating element area "S" must be made smaller, or (4) the pulse width "t" must be made larger.

However, there is a limit to decrease the heating element resistance value "R" because of the material of print head. If the heating element resistance value "R" should become smaller, the current "i" flowing to the heating element 2 becomes greater, so the saturation voltage "VS" is enlarged. The saturation voltage "Vs" becomes an ineffective energy and has no effect on the print coloring.

This can be explained as $$Current\ "i" = (V - Vs)/R,$$

but this is the current flowing to a single heating element, and the total current flowing to the actual print head 1 will become as follows:

$$\sum_n i = \sum \frac{(V - Vs)^2}{R}$$

Namely, the saturation voltage Vs depends on the current "i" and becomes approximately as follows:

$$Vs = ai + b.$$

(For information, the voltage actually becomes non-linear from the saturation characteristics of the switching transistor).

Therefore, if the current "i" becomes greater, the saturation voltage Vs is increased, and because the formula V−Vs becomes smaller, the print energy "$\epsilon$" becomes smaller.

In addition, if a battery is used, it generates the new problematic point that the presence of internal impedance from using the battery becomes a printing problem as the drop in voltage because the impressed voltage "V" itself depends on the current "i" and therefore fluctuates with the loss inside the head due to the common conductor inside the head. For this reason, the optimum range of heating element resistance "R" is determined by itself, and consequently the pulse width "t" must essentially be set to relatively narrow value.

Enlarging the pulse width "t" results generally in enlarging the print cycle, so the print speed becomes slow. The pulse width "t" can not be set to a high value because realize a high speed printing is desirable.

Decreasing the pulse width generally results in decreasing the print cycle, so that the print speed can be accelerated. However, decreasing the pulse width involves the problematic point that the print energy "$\epsilon$" essentially becomes smaller.

Therefore, an object of this invention is to present a thermal printer to print at high speed with the drive of low voltage of around 4.8 to 5 V while preventing the printing troubles attributable to the fall in voltage coming from the internal impedance and to the loss in head due to the common conductor inside the head. and moreover, it is another object to present a line thermal printer capable of obtaining the favorable print quality against a variety of thermosensitive papers while preventing the drop in print speed even in the case of low voltage, for example, of around 4.8 to 5.0 V.

SUMMARY OF THE INVENTION

A line thermal printer relating to the present invention adopts the basic technical structure as follows so as to achieve the aforementioned objects.

The first pattern relating to the line thermal printer of this invention, is a line thermal printer which prints by electrically heating the print head having a plurality of heating elements to color a thermosensitive paper in contact with the said heating elements, which is equipped with a print head consisting of a plurality of pieces of print block groups where the plurality of heating elements have been subdivided at every stipulated quantity and with a heating means for electrically heating the heating elements based on the stipulated data at every print block aforementioned. The heating means constructed to simultaneously heat at least 2 print blocks, which have been selected from the print block groups. The second pattern, is a line thermal printer to print by electrically heating the print head having a plurality of heating elements to color a thermosensitive paper in contact with the heating elements, which is not only equipped with a heating means for electrically heating the heating elements based on the stipulated data against the applicable print head, but also with a plurality of printing modes in accordance with the kinds of thermosensitive papers and an electrification controlling means for controlling the electrification to the print head with the print cycle being fixed, the electrification controlling means being structured such that it can determine the electrification cycle to the print head based on the printing mode and can vary the print energy per unit area.

for information, the said thermal printer has a plurality of different printing modes. The terminal printer and may be structured so that the heating means can change the number of the print blocks to be heated simultaneously and the pattern of heating elements to be heated on the basis of the data in the print blocks in accordance with the printing mode. It is effective to structure the thermal printer by installing a print percentage judgement means for judging the number of heating elements to be heated against the number of all the heating elements in the print blocks based on the data so that the heating means may further divide and heat the said print blocks if the number of heating elements to be heated of the heating means should have exceeded the stipulated number by the applicable print percentage judgement means.

In the present invention, the heating elements in a plurality of print block area simultaneously heated by the heating means, and thereby the printing is made on the thermosensitive paper. Namely, the printing can be accelerated even with the drive at a low voltage, for example, of around 4.8 V to 5.0 V.

Moreover, if the number of heating elements in the print head to be heated by the heating means has exceeded the stipulated number, the print heads are further subdivided and heated by the heating means, and hence such printing troubles as reduction in voltage resulting from internal impedance and an internal heat loss in the head caused by a common conductor provided inside the head can be prevented.

Therefore, the printing troubles attributable to the reduction in voltage resulting from internal impedance and to the internal heat loss in the head caused by the common conductors provided inside the head, can be prevented. Moreover, the printing can be made at a high speed with the drive at low voltage of around 4.8 V to 5.0 V.

Further, in the present invention, the electrification to the print head is controlled with the print period being fixed by the electrification controlling means. The electrification cycles to the print head are determined on the basis of a plurality of printing modes in accordance with the kinds of thermosensitive papers, and the print energy per unit area is varied.

Therefore, the fall in print speed is prevented even with the drive at a low voltage, for example, of around 4.8 V to 5.0 V, and a favorable print quality can be obtained using a variety of thermosensitive papers.

DESCRIPTION OF THE DRAWINGS

FIG. 12 is a diagram showing in table the relation between the print percentage and the print speed.

FIG. 15 is a diagram showing an example of similar data processing.

FIG. 16(A) through 16(D) diagrams for explaining the principle where the print quality is improved by the present invention.

FIG. 17(A) and 17(B) are diagrams for explaining the print system of line thermal printer by the conventional system.

FIG. 21 is a diagram showing the electrification timing during 1-ply printing mode in the present invention.

FIG. 23(A) and 23(B) are diagrams showing the entire control system of a line thermal printer in this invention.

DESCRIPTION OF THE PREFERRED EMBODIMENTS

Some preferred embodiments of this invention are to be described on the basis of the drawings herein.

FIGS. 3 through FIG. 13 are diagrams showing a preferred embodiment of thermal printer relating to the first embodiment of this invention.

First, its structure is to be explained.

Figure 1:
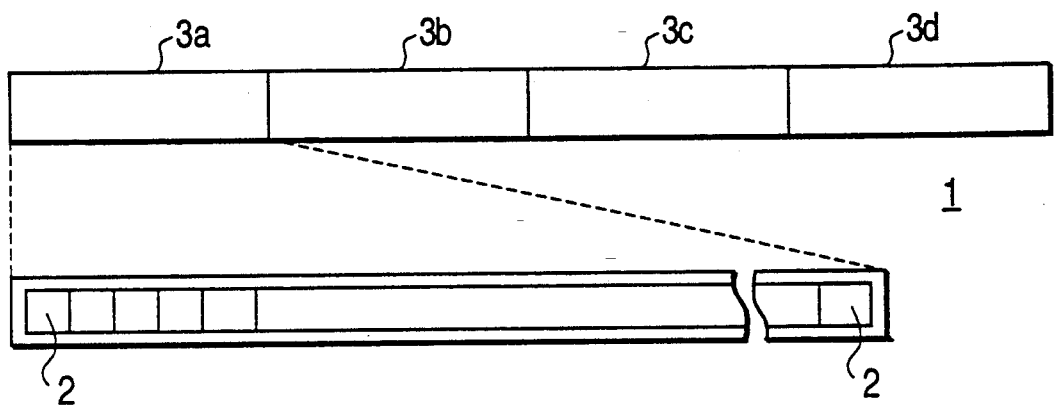
FIG. 1 is a schematic diagram of print head in conventional example.
Figure 2:
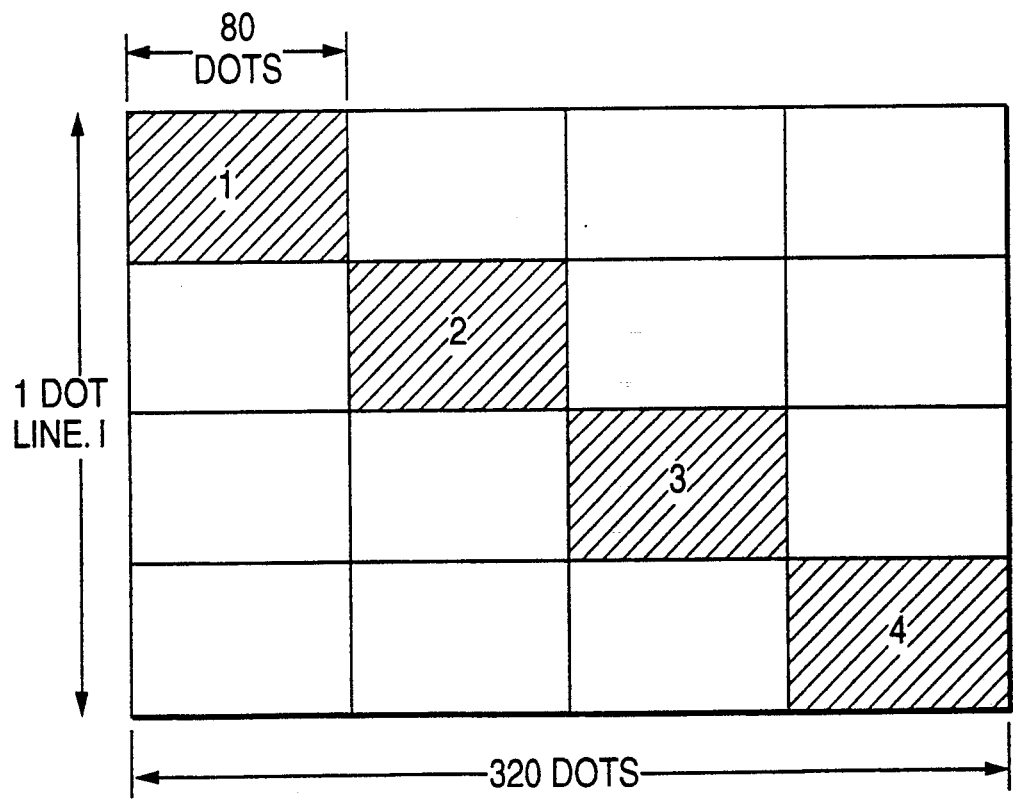
FIG. 2 is a diagram showing an electrification timing in a conventional example.
Figure 3:
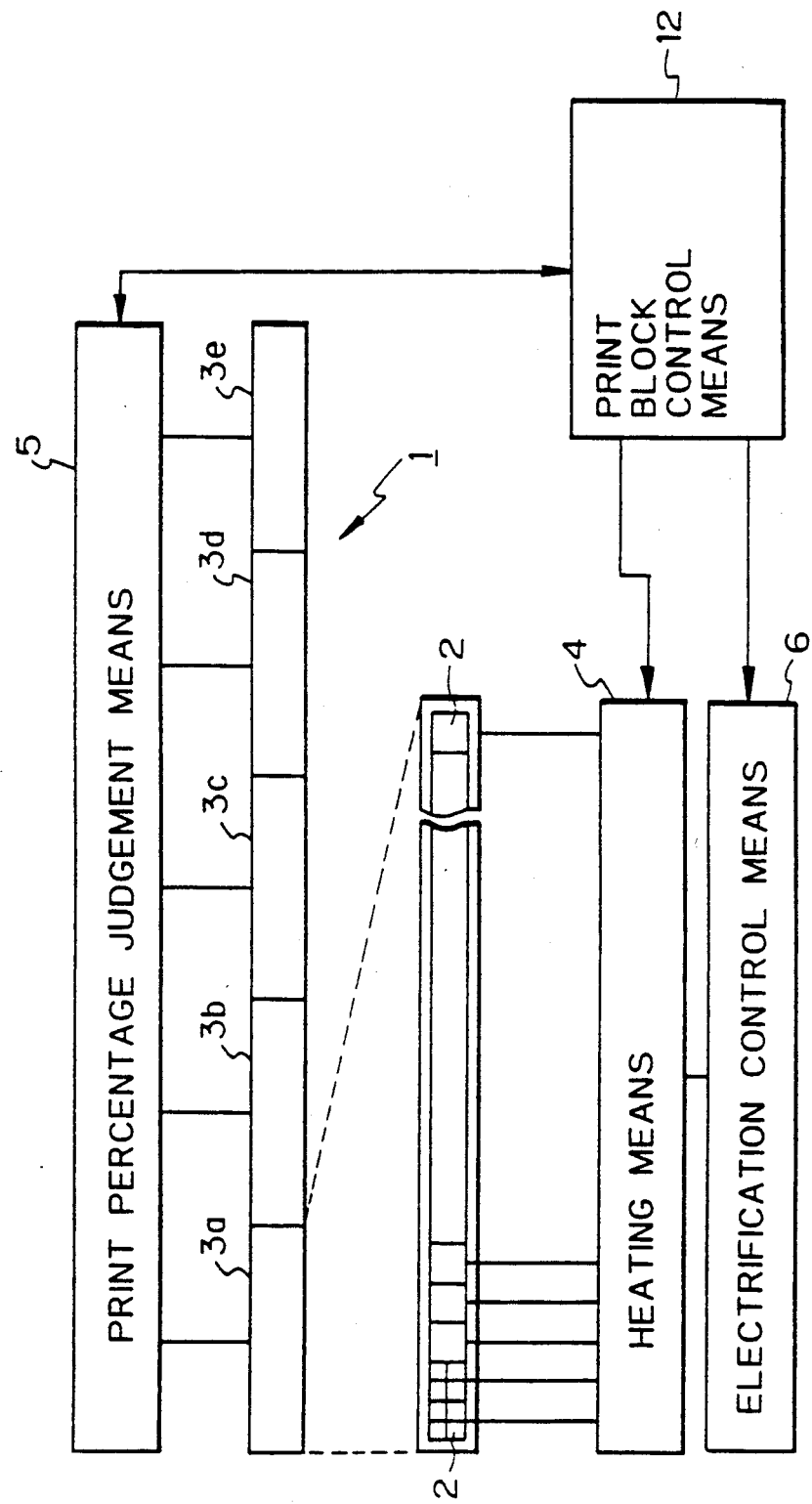
FIG. 3 is a schematic diagram of its print head.

As shown in FIG. 3, the print head 1 of thermal printer of this embodiment is structured of 5 print blocks 3a through 3e, where the heating element 2 of 320 dots per dot line has been subdivided at every 64 dots.

Numeral 4 is a heating means and Numeral 5 is a print percentage judgement means. Further, Numeral 6 is an electrification control means used in the second embodiment being described later.

The heating means 4 is for flowing the current to the heating element 2 at print blocks 3a through 3e on the basis of the stipulated data, and the heating means 4 changes the number of print blocks 3a through 3e to be simultaneously heated and the pattern of heating element 2 to be heated in the print blocks 3a through 3e in accordance with a plurality of different printing modes, which are described later.

The individual heating elements used to the present invention are structured of a plurality as units Ul through Un (FIG. 4 shows an example of 4 heating elements) as shown by the example of FIG. 4, and each unit heating element is structured so that the heating is controlled individually and independently.

The print percentage judgement means 5 is for dividing and heating the print blocks 3a through 3e to be heated by the heating means 4 if the number of unit heating elements to be heated among all of the unit heating elements 2 in each of the print blocks 3a through 3e, i.e., the print percentage, has become higher than the stipulated value. The print percentage judgement means 5 is also for reducing the number of data to be printed in lump and for enlarging the print period.

Since, the energy required for the printing is $$\epsilon = \frac{(V - Vs)^2}{R} \cdot t/S$$

the heating element resistance value "R" must be decreased or the pulse width "t" must be enlarged in order to decrease the impressed voltage "V". Therefore, to obtain the printing at a high speed with a low voltage considering the aforementioned in the present embodiment, the impressed voltage "V" is set to a value from 4.5 to 6.5 V, the heating element resistance value "R" to 45 $\Omega$ +/− 10%, the heating element area "S" to 6 head resolutions/mm, and the pulse width has been so set that the values may become W 0.165 mm ×H 0.165 mm for 1-ply label paper and W 0.165 mm ×H 0.330 mm for 2-ply paper.

Additionally, for enlarging the pulse width "t" without sacrificing the print speed, the present embodiment simultaneously heats the heating elements 2 in a plurality of print blocks 3a through 3e by the heating means 4.

Figure 13:
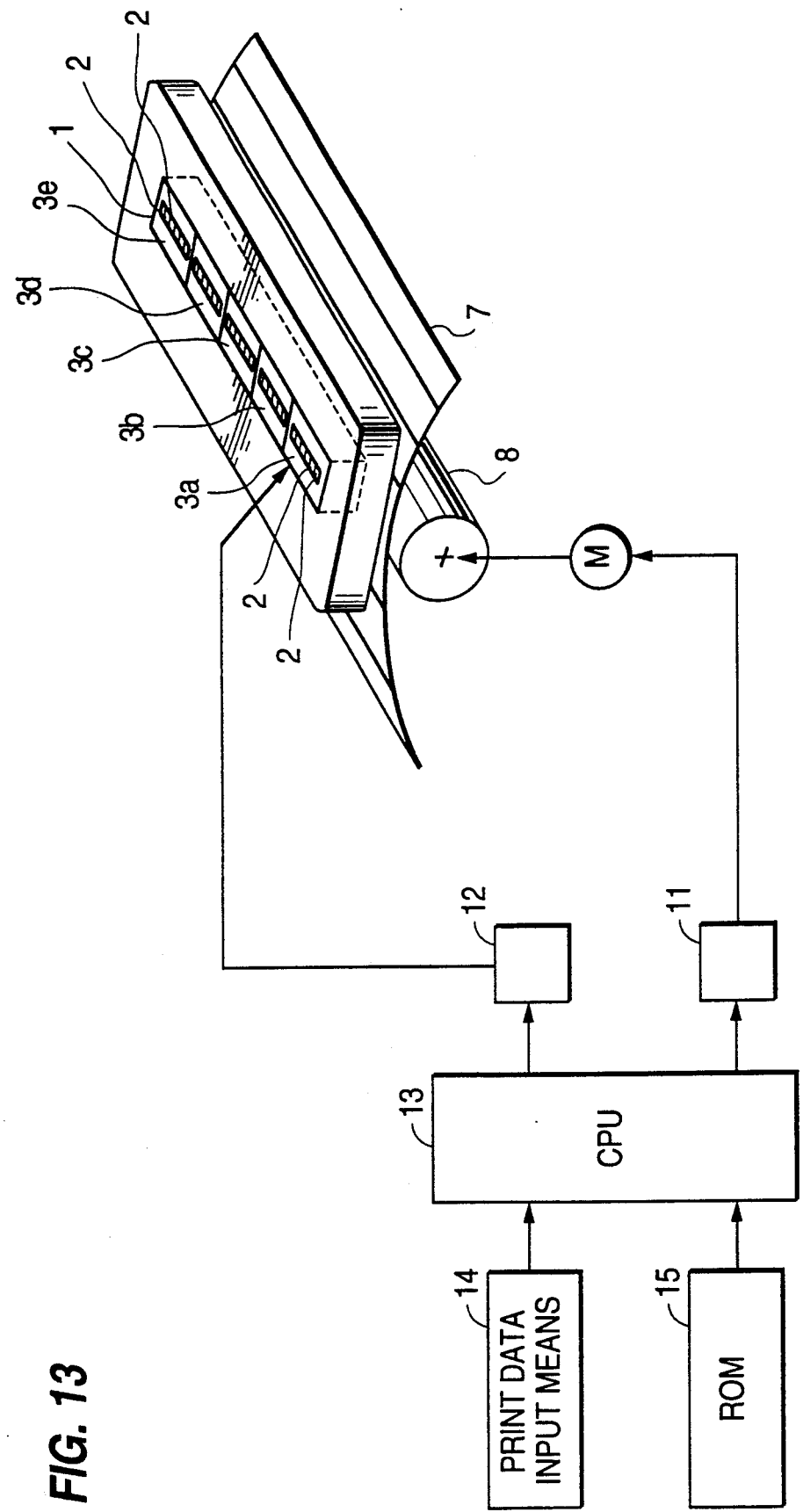
FIG. 13 is a figure to explain the outline of the drive control system of a line thermal printer relating to the present invention.

Here, the outline of control system of line thermal printer relating to the present invention is to be explained according to FIG. 13.

The print unit of a line thermal printer relating to the present invention sheet transfer means 8 consisting of the platen rollers, etc. being driven by a motor "M" for moving the paper and the like 7, which is a sheet to be printed in a given direction at the stipulated speed and at the stipulated pitch. The print unit further comprises head 1 including the print block group 3, which has been constructed by further arranging in series the print blocks 3a, 3b, 3c, . . . , which laid out in a series of heating elements 2 parallel with the rotary shaft direction of the sheet transfer means 8 in contact with the sheet transfer means 8. The print unit further comprises a sheet transfer controlling means 11 for controlling the sheet transfer means 8 and a print block control means 12 for driving and controlling the print block of the print section. The sheet transfer controlling means 11 and the print block control means 12 are structured so that they are controlled by the central processing unit (CPU) 13, which is connected to the print data input instruction means 14 and the print data memory means 15 consisting, for example, of ROM where the stipulated print data are stored.

Figure 14:
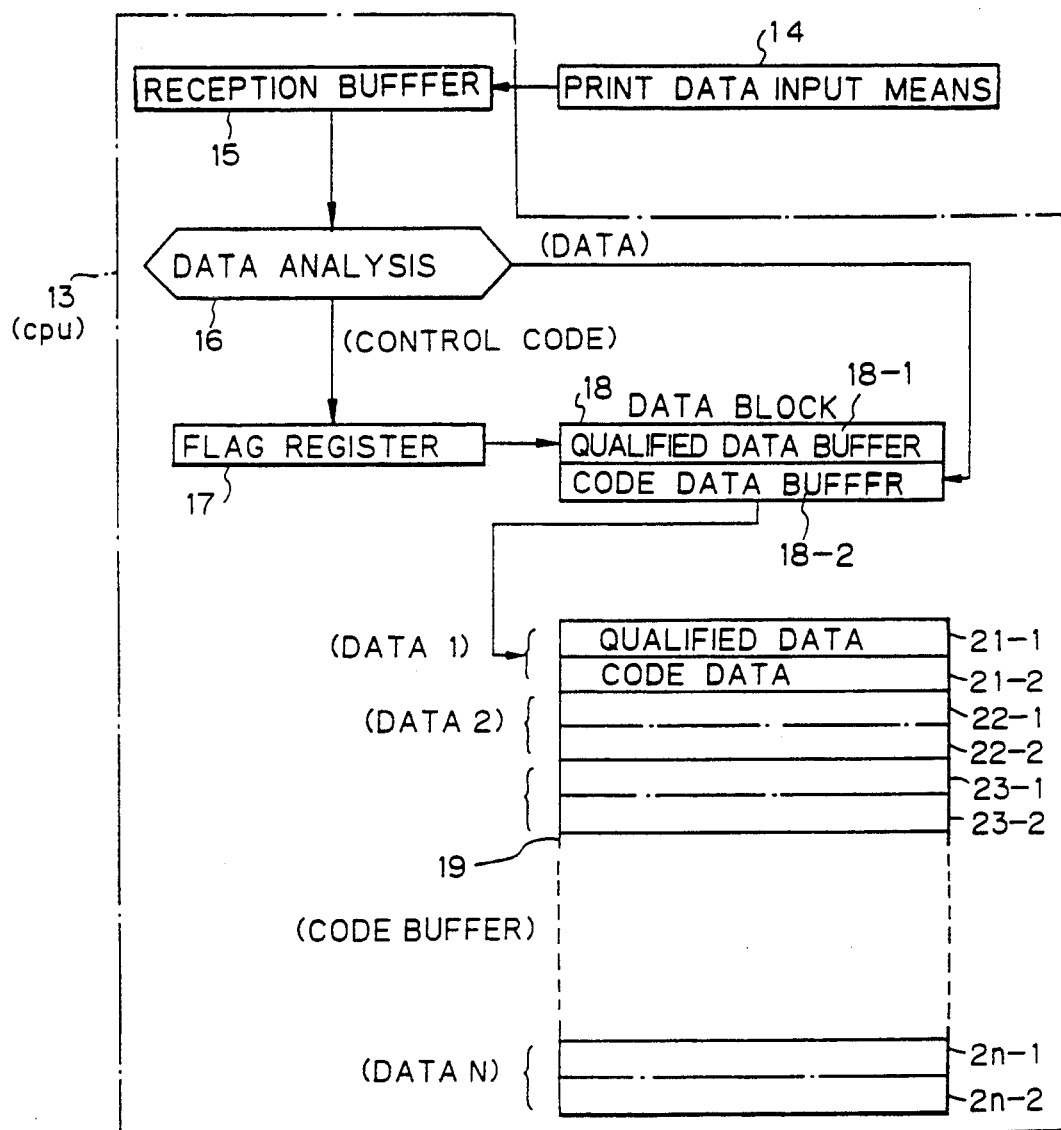
FIG. 14 is a diagram showing an example of data processing used to the drive control of line thermal printer is this invention.

Next, the print data processing procedure of line thermal printer in this invention is to be explained in accordance with FIG. 14 and FIG. 15.

First, if the stipulated print data to be printed is input to the print data instruction means 14, its data is taken into the reception buffer 15 inside the central processing unit (CPU) 13, and the received data is analyzed in the data analysis means 16 for separation into the control code CD and the data D. The control code CD is transferred to a flag register 17, while the data D is transferred to the code data buffer 18-2 of data block 18.

On the other hand, the control code CD is the information for designating the kind of mode, for example, as a high speed printing mode. High quality printing mode and a double-density printing mode, and the flag and parameter set processing is executed in the flag register 17 for transferal to the qualified data buffer 18-1 of data block 18.

Next, the information of the data buffer 18 is transferred to the code buffer 19 comprising a RAM and so forth.

The code buffer 19 has the buffers (20-1, 20-2), (21-1, 21-2) ... (2n-1, 2n-2) for storing the qualified data and the code data against the respective data, and each of the data that have been transferred is to be stored into each of the buffers.

Next, the stipulated data to be printed, which has been stored into the said code buffer 19, is transferred to the task table 22 as shown in FIG. 15.

The task units 22-1, 22-2, ... 22-n are storing individually a plurality of tasks (Task #1 through Task #N) are arranged on the task table 22. Each of these task units 22-1, 22-2, ... 22-n includes the functions responsive to each of the qualified data corresponding to modes such as the high speed printing mode, high quality printing mode and double-density printing mode. Any of the tasks can be selected by discriminating the flag of qualified data associated with each data, which has been transferred from the said code buffer 19.

If the qualified data associated with the data 1, which has been transferred from the said code buffer 19 indicates a high speed printing mode, the task unit 22-2 incorporating the task #2 corresponding to the program for processing the high speed printing mode, for example, is selected and the code data having the data 1 is also transferred simultaneously to the applicable task unit 22-2.

Next, based on the code data associated with the data1 the cpu reads out the font data, which has been stored into the applicable font address from the font table 24 of character generation (CG) in accordance with the font address associated with the code data, returns it to the said task unit 22-2, processes at high speed printing mode the font data, which has been read out by the task unit 22-2 in accordance with the program of qualified flag associated with the task unit 22-2, and writes and stores its result into the image buffer 25.

The applicable image buffer 25 in the present invention comprises, for example 2, image buffers 26 and 27, and the first image buffer 26 is for storing the print data of 1 line portion to be printed now whereas and second image buffer 27 is for storing the print data of 1 line portion at a step before 1 line which is to be printed now.

The applicable image buffer in this invention should not be limited to the buffer, which combines 2 buffers, and needless to say, it may combine a plurality of image buffers of more than 3 buffers.

The print control in this invention can adopt 32 dots, for example, in the double-density mode of letters and can adopt 16 dots in the usual mode.

And in the present invention, the print data for 1 line portion structuring 1 dot is to be stored into a single piece of image. Moreover, in the present invention, the respective heating elements 2 of applicable print blocks are to be electrified for the printing in the stipulated timing on the basis of the print data, which has been stored into the applicable image buffer, but the stipulated 1 line is divided several times for its electrification, and 1 line is subdivided, for example, 5 times for its electrification processing.

Therefore, because 32 dots are adopted in the double-density mode, 160 times of electrification processing are required in the 32 lines×5 electrifications to print a letter, and because 16 dots are adopted in the usual mode, 80 times of electrification processing required in the 16 lines×5 electrifications.

If the present invention adopts both the double-density mode and the usual mode, the heating element 2 in this invention shall preferably comprise 4 pieces of heating element units U1 through U4 as shown in FIG. 3 or FIG. 4.

The embodiment of print processing procedure relating to the present invention is to be described.

The line thermal printer of this embodiment is provided with the following 4 kinds of modes
1) High speed printing mode,
2) High quality printing mode,
3) Reduction printing mode, and
4) Double-density printing mode, The high speed printing mode adopts the so called 3 burn system where the heating elements 2 in the continuous print blocks 3a through 3e are heated simultaneously by the heating means 4. As a result of the 3 burns, the number of dots subjected to the simultaneous printing operation becomes greater. In short, the number dots subjected to of the simultaneously electrification becomes as follows through the reduction in data:

$$320 \times 3/5 \times \tfrac{1}{2} = 96 \text{ (dots)}.$$

Therefore, if the print percentage has become higher than the stipulated value by the print percentage judgement means 5, the number of data of print data at lump is reduced and the print period is elongated.

Since the judgement is made in the unit of respective print blocks 3a through 3e in the print percentage judgement means 5, the printing can be made without any fall in the print speed as a whole.

Figure 4A:
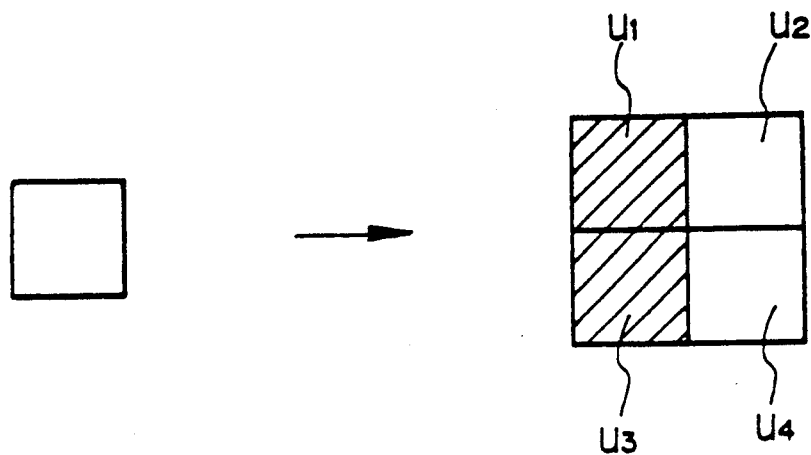
FIGS. 4(*a*) and (*b*) are diagrams showing the relation between the print data at a high speed printing mode and the actual printing.
Figure 4B:
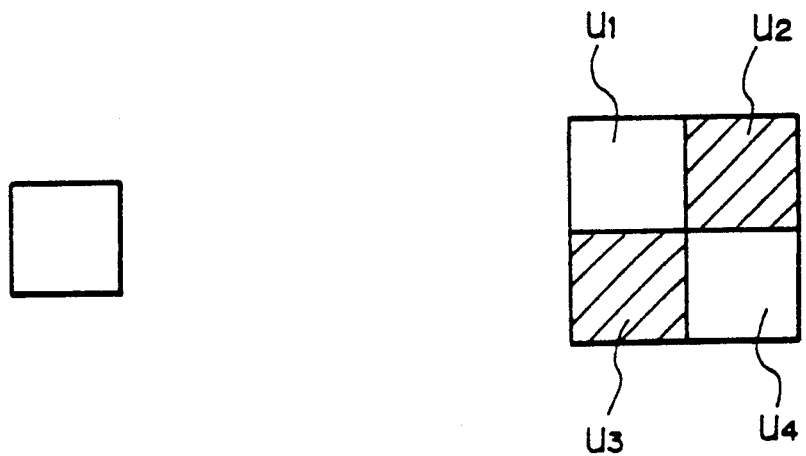

In addition, for raising the print speed, the number of print dots in a horizontal direction is reduced by 50% in the high speed printing, and the relation of print data with actual print is such that, in the case of character printing mode, 2 picture elements in a vertical direction out of 2×2 matrix are printed against the data of 1 picture element as shown in FIG. 4(a). In the case of the image printing mode, 2 picture elements in an oblique direction out of 2×2 matrix are printed against the data of 1 picture element as shown in FIG. 4(b).

Figure 5:
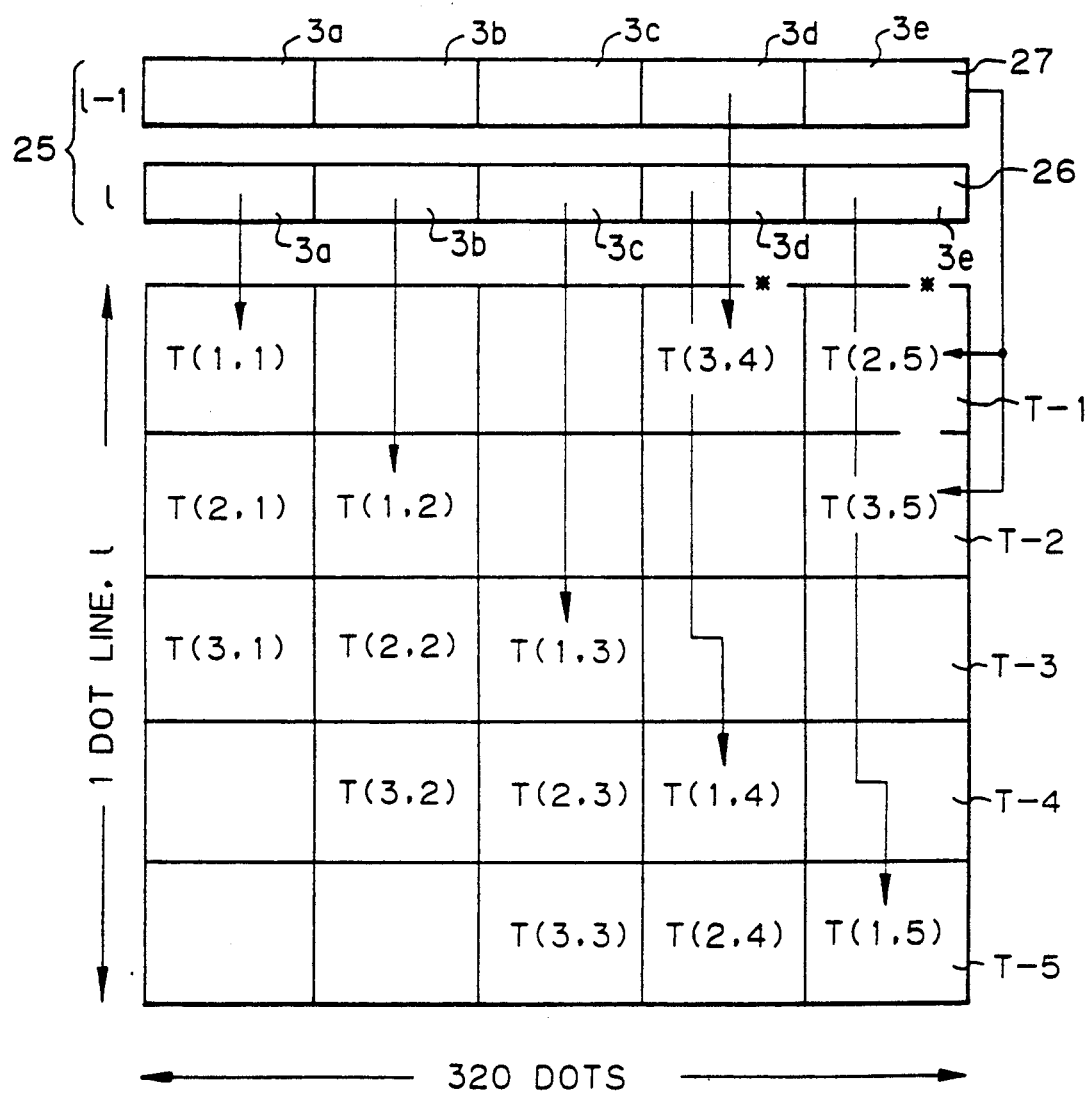
FIG. 5 is a chart showing the electrification timing at a high speed printing mode.

The electrification timing in this invention is indicated by $T(\alpha, \beta)$ as shown in FIG. 5, where the $\alpha$ of $T(\alpha, \beta)$ denotes the $\alpha$th pulse while the $\beta$ denotes the print block of $\beta$th group, while the asterisk * mark denotes the electrification of dot line at a step ahead.

In other words, the present invention shows the example of electrifying the 1 line "l" 5 times if printing a single dot line "l", and the T-1 through T-5 in FIG. 5 are for dividing a single line "l" into 5 times to designate the number of blocks to be electrified during the occurrence T-1 of first pulse and to designate the number of blocks to be electrified during the occurrence T-2 of second pulse, which is thereafter applicable in the same manner to T-3 through T-5. As described above, this invention adopts, as an embodiment, the adoption of 2 image buffers, and therefore, the 1st image buffer 26, which has stored the print data that is to be printed on the line "l" and the second image buffer 27 which has stored the print data that has been printed or is being printed into the line "l-1" at a step ahead of 1 line are laid out in FIG. 5.

The print processing control of this invention has been structured such that, when if one cycle of electrification control in 1 line "l" has been through, the sheet 7 to be printed is to be moved a slight distance by turning the motor M a slight angle on the basis of the control signal from the sheet transfer control means 11.

The electrification timing in FIG. 5 is to be explained herein. First, if the first electrification pulse T-1 is generated, the current is carried to the block 3a of first image buffer 26 and to the blocks 3d and 3e in the 2nd image buffer 27 for individually heating the respective heating elements 2 that are included in the applicable blocks on the basis of the print data, which have been stored into the blocks.

Next, if the 2nd electrification pulse T-2 is generated after shifting the sheet 7 by the stipulated short distance, the current is carried to the blocks 3a and 3b of first image buffer 26 and to the block 3e in second image buffer 27 for individually heating the respective heating elements 2 which are included in the blocks on the basis of the print data that has been stored in the blocks.

Similarly herein, if the second electrification pulse T-3 is generated, the current is carried to the blocks 3a, 3b and 3c of 1st image buffer 26 for individually heating the respective heating elements 2, which are included in the blocks on the basis of the print data that has been stored into the blocks.

That is to say, the high speed printing mode in the present embodiment employs a 3-burn system for simultaneously electrifying 3 print blocks out of a plurality of print blocks (5 pieces in this embodiment) in the electrification processing of 1 print line, and thereby a high speed printing can be realized.

The high quality printing mode adopts the so called 2-burn system where the heating elements 2 in the continuous 2 print blocks 3a through 33 are simultaneously heated by the heating means 4, and because of the 2-burn, the print blocks which are adjacent among the print blocks 3a through 3e can be electrified at the same time.

Furthermore, because of the high quality printing, the print percentage is twice as great compared with the high speed printing mode. Namely, the number of dots in object of the simultaneous electrification will become $$320 \times 2/5 = 128 \text{ (dots)},$$

which results in the rise of high speed printing mode by about 30%, and the printing speed falls down as a whole if compared with the high speed printing mode.

Figure 6:
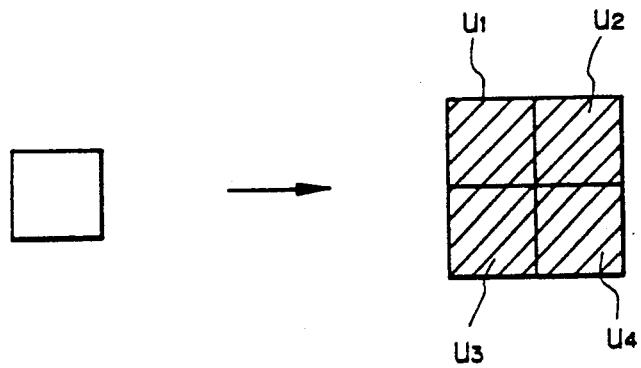
FIG. 6 is a diagram showing the relation between the print data at a high quality printing mode and the actual printing.

Since the high quality mode corresponds to the printing on 2-ply paper and so forth and becomes the mode where the number of print dots are not reduced, the relation of the print data with the actual printing is such that all the picture elements in $2 \times 2$ matrix are printed against the data of 1 picture element as shown in FIG. 6 in both the character printing mode and image printing mode.

Figure 7:
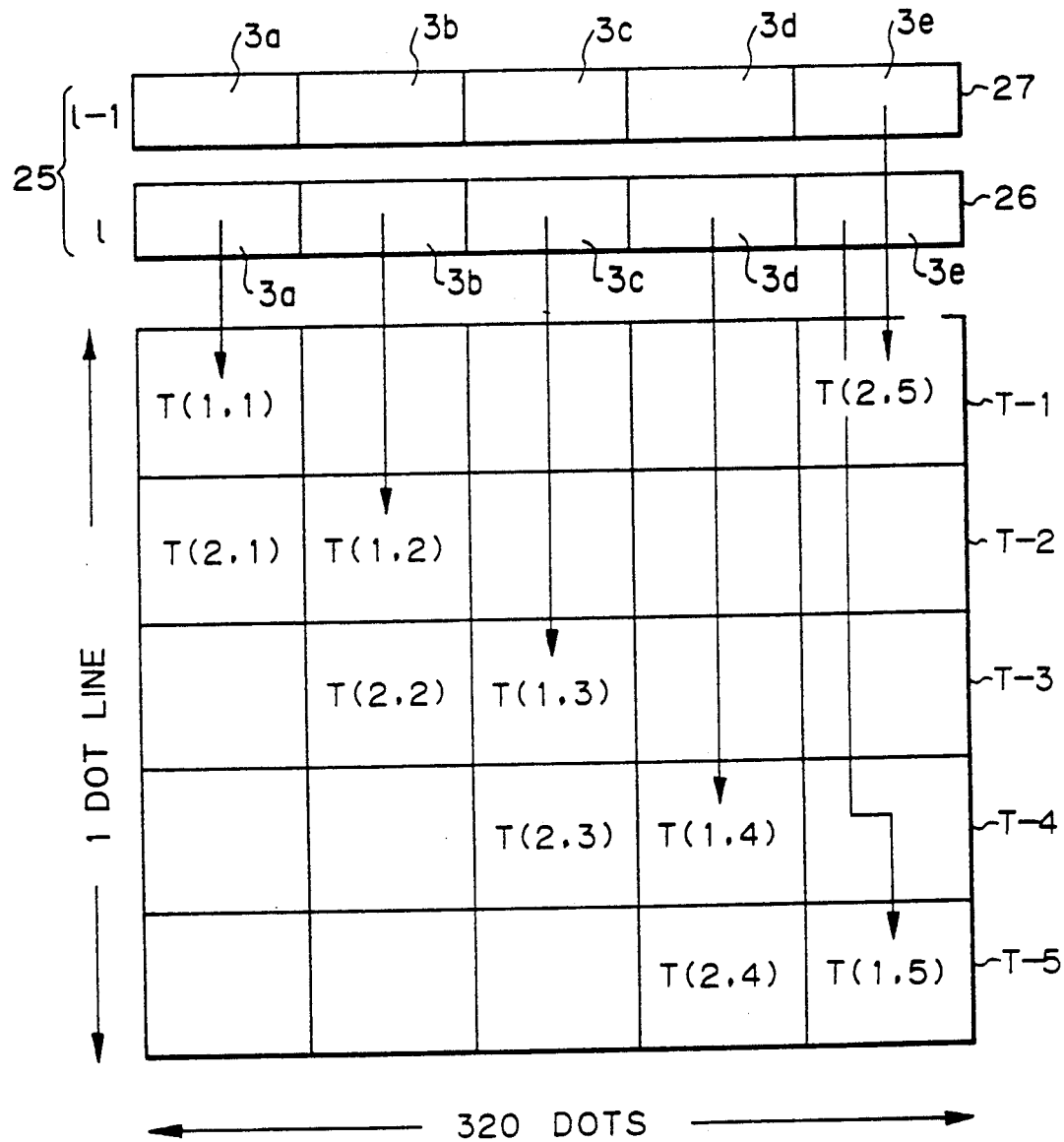
FIG. 7 is a diagram showing the electrification at a high quality printing mode.

The electrification timing is indicated by T $(60, \beta)$ as shown in FIG. 7. The $\alpha$ os T $(\alpha, \beta)$ is the $\alpha$th pulse while the $\beta$ shows the print block of the $\beta$th group. Moreover, the asterisk * mark denotes the electrification of dot line at a step ahead.

The detailed explanation of FIG. 7 is to be omitted because it is identical to that of FIG. 5 excepting that the print block for electrification during the occurrence of 1 electrification pulse is two adjacent print blocks.

The reason for the higher print speed realized by adopting a plurality of burn systems like those in this invention is as given below.

Figure 19:
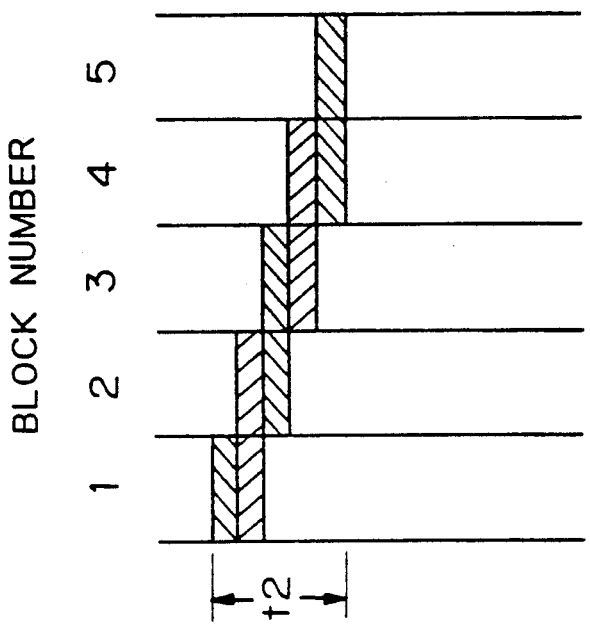
FIG. 19(A) and 19(B) are diagrams for explaining the comparison of a variety of burn systems in the present invention and conventional system.
Figure 19:
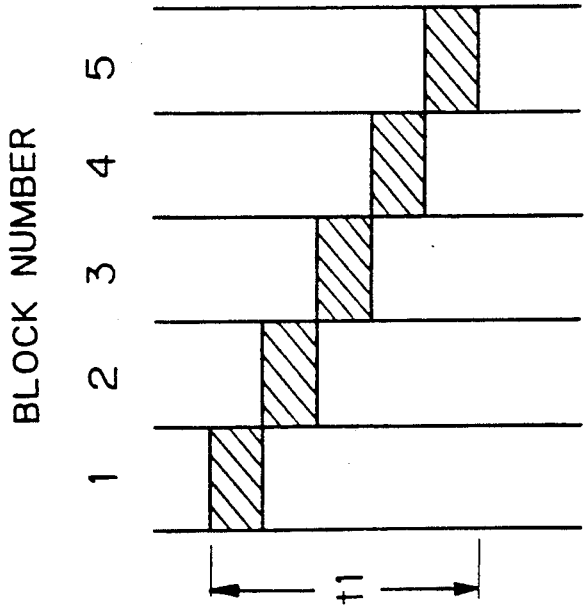

For example, suppose the head having 320 dots in 1 dot line, which are divided into 5 blocks of 64 dots as shown in FIG. 19(A), the conventional system employs the method of sequentially driving them in the unit of 1 block. In this method, the coloring energy against the paper from the heating element must be supplied in one electrification. However, as shown in FIG. 19(b), the present invention system reduces the width of standard electrification time to half in contrast with the said system and electrifies a plurality of adjacent blocks at a time. In this system, the printing can end in half the time of the conventional system.

Additionally, because the heat usually issued by the heating elements decreases index-functionally. The coloring energy also tends to become larger as the print period becomes longer because the print period becomes shorter if the printing is made at a higher speed in accordance with this system. Such a synergistic effect makes it appear that an efficient drive is possible by utilizing the heat accumulation effect.

Next, the difference between the printing method in this invention and the conventional printing method is to be explained by use of FIG. 17 and FIG. 18.

FIGS. 17(A) and (B) show the examples of the conventional printing method, which are identical to the structure of this invention such that 1 dot line is composed of 320 dots and is structured of 5 blocks including 64 dots each 1 block. However, in the conventional system in FIG. 17(A), only 1 block is electrified in a single electrification pulse. Hence there is the problem that a slight interval or gap is generated against the print data, which has been printed during the generation of a previous electrification pulse (the pulse at a step 6 pulses ahead. Moreover, there is the problem that the volume of load required during the electrification at one time is great even if the next electrification pulse has come in the same block for electrification processing.

The conventional example shown in FIG. 17(B) indicates an example of electrifying and processing 3 continuous blocks simultaneously with one electrification pulse but individually electrifying the respective residual print blocks in other electrification pulses. However, even in this type of embodiment, there appears the problems that there is a slight interval between the print data which has been printed during the generation of previous electrification pulses and the data printed by the current electrification.

Figure 18A:
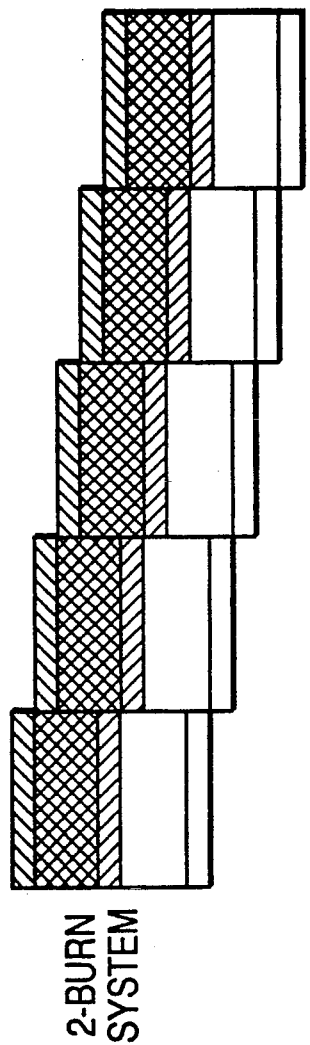
FIG. 18(A) and 18(B) are diagrams for explaining the print system of line thermal printer by the system of this invention.
Figure 18B:
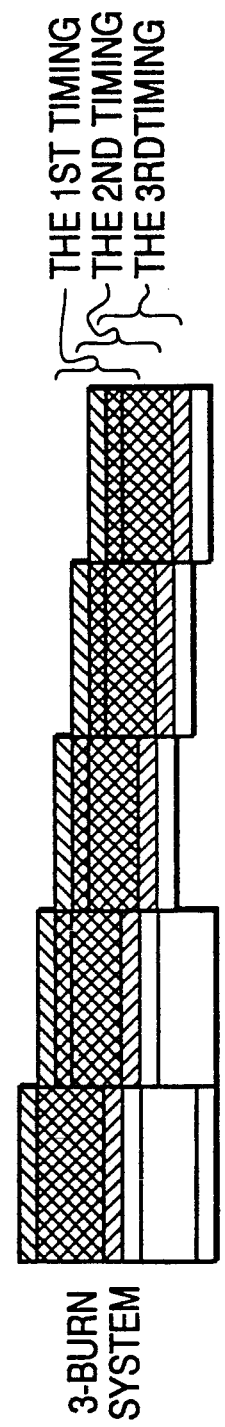

However, in the present invention, because a plurality of print blocks enclosed by a thick line in the figure are simultaneously electrified for processing against one electrification pulse in both the 2-burn system and 3-burn system as shown in FIG. 18(A) and FIG. 18(B), the same print data are printed in overlap several times on the printing sheet though they involve a slight deviation respectively. Hence, the system contributes to the enhancement of print speed because the print density can be enhanced and the print density can be reduced accordingly.

Figure 8:
FIG. 8 is a diagram showing the relation between the print data at a reduction printing mode and the actual printing.

The reduction printing mode is the mode for printing more printed digits in a line compared with the high speed printing mode. The relation between the print data and the actual printing is for printing 3 picture elements against the data of 2 printing elements as shown in FIG. 8, while the relation of the print data "a" and "b" in FIG. 8 with the data "$\alpha$", "$\beta$" and "$\gamma$" being printed in reduction is to be converted on the basis of such a principle as shown in Table 1.

TABLE 1

| a | b | α | β | γ |
|---|---|---|---|---|
| 0 | 0 | 0 | 0 | 0 |
| 0 | 1 | 0 | 1 | 1 |
| 1 | 0 | 1 | 1 | 0 |
| 1 | 1 | 1 | 1 | 1 |

The electrification timing is set in the same timing as the high quality printing mode.

Figure 9:
FIG. 9 is a diagram showing the relation between the print data at a double-density printing mode and the actual printing.

The double density printing mode is the mode which becomes the number of print data of 320 dots/line relation of the print data and the actual printing is for printing 1 picture element against the data of 1 picture as shown in FIG. 9, or the highest density printing becomes possible and therefore is the mode capable of printing the bar code and so forth.

Further, the electrification timing is set to the same mode as the high quality printing mode in a way similar to the reduction printing mode.

As described above, the optimum printing can be made in accordance with each application by the four operation modes, and the stabilization of print quality can be attempted by decreasing the influence in voltage drop due to impedance inside the battery by the print percentage judgement means 5.

FIG. 16 shows the principle for enhancing the quality, namely the density of printing by using a plurality of burn systems according to the present invention.

That is to say, in the electrification timing diagram (TMG) of FIG. 16(A), the N-th print block is to be electrified respectively in the electrification pulses F1 through F3 using the 3-burn system (See FIG. 16(B)). On the other hand, the conventional system electrifies a single print block "N" only once in 1 line portion. The print density distribution of print data alone can be obtained as shown in the shaded area of FIG. 16(C). Since a blank area exists against the adjacent print data, there is the drawback that the density looks thinner, while in this invention, because the same print block "N" is electrified 3 times continuously and moreover the printed sheet moves bit by bit during each electrification period, the print density as shown in FIG. (D) can be obtained where the density looks thicker.

Figure 10:
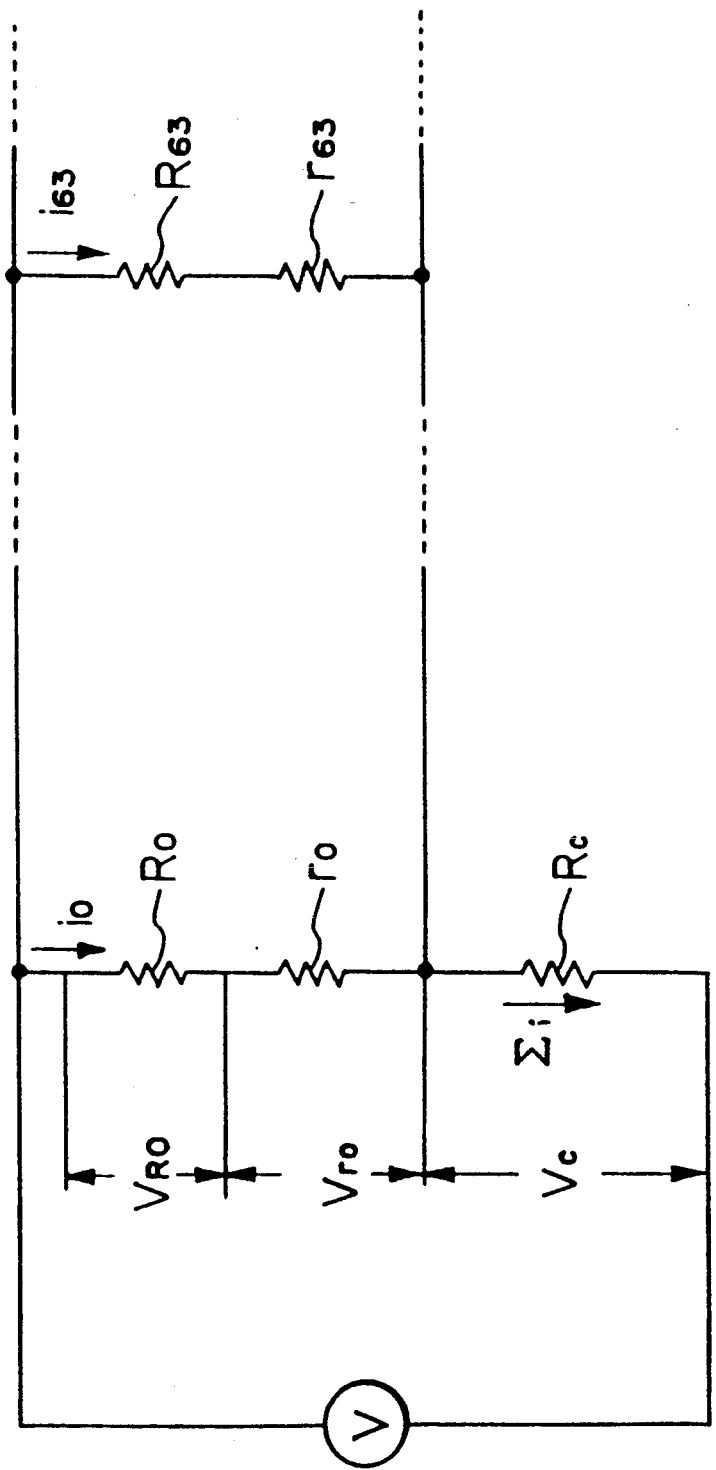
FIG. 10 is an equivalent circuit of print head.

Next, the equivalent circuit of the thermal head used in this invention is shown in FIG. 10.

In FIG. 10, Ro to $R_{63}$ are the heating element resistors, while ro to $r_{63}$ are lead resistors. Rc is a common conductor resistance, while io to $i_{63}$ are the current flowing through the heating element resistors and the current flowing to the lead resistors (hereinafter to be called the heating lead current). $V_{RO}$ to $V_{R63}$ are the voltages being impressed to the heating element resistors (hereinafter to be called the heating element voltages). Vro to $V_{r63}$ are the voltages being applied to the lead resistors (hereinafter to be referred to as the lead voltages). Vc is the voltage to be impressed to the common conductor resistor (hereinafter to be called the common voltage), and $\Sigma i$ is the current being flown to the common conductor resistor Rc (hereinafter to be named the common current), which becomes the total of heating lead currents io through $i_{63}$.

In short, the heating element voltage $V_{RO}$, the lead voltage Vro and the common voltage Vc are expressed as $$V_{RO} = io \cdot Ro$$

$$Vro = io \cdot ro$$

$$Vc = A_{(i)} \cdot \Sigma i$$

The $A_{(i)}$ is the variable influenced by a non-linear portion, internal transistor Tr section and the like, and the $A_{(i)} \cdot \Sigma i$ interrelates to the number of electrified dots out of 64 dots of the heating element 2 of a single block among the print blocks 3a through 3e. Therefore, the Vc also becomes non-linear.

As shown in FIG. 10, the common conductor resistor Rc is non-linear, and the value of common conductor resistor Rc is changed by the number of electrification heating elements in one of print blocks 3a through 3e.

Further, the influence on the energy "ε" much greater if the value of heating element resistor Ro is small. If the value of the heating element resistor Ro is sufficiently large, the value of lead resistor "ro" is very small, so that the percentage against the entire resistance becomes small and its influence is less. However, if the value of the heating element resistor Ro is small, a small value of the lead resistor "ro" becomes greater in the percentage against the entire resistance and its influence becomes greater.

Suppose that the heating element 2 of n-dots portion is to be electrified. (However, because the maximum dots are 64 in the same print block, $0 < n <$ or $= 64$). From the relation of $io \cdot Ro + io \cdot ro + Vc = V$, the voltage being impressed to the heating element 2 is $io \cdot Ro = V - Vc - io \cdot ro$, and therefore, the following equation can be obtained:

$$\epsilon = io \cdot Ro^2 \cdot T/S$$
$$= (V - Vc - io \cdot ro) Ro \cdot T/S.$$

Here, if the impressed voltage V is the drive by battery, apart from the case of a constant voltage, the actual voltage V becomes the original voltage $V_D$ minus the battery internal impedance $rb \cdot \Sigma i$ because of the battery internal impedance, the following equation can be obtained:

$$\epsilon = (V_D - io \cdot ro - Vc - rb \cdot \Sigma i) Ro \cdot T/S$$
$$= [V_D - io \cdot ro - (A_{(i)} + rb) \Sigma i] Ro \cdot T/S.$$

Because the value of $io \cdot ro$ is considered to be sufficiently small against the other values, the influence of the item $(A_{(i)} + rb) \Sigma i$ is sufficiently large. For correcting it, there is the need for attempting the fractionization and reducing the energy fluctuation in accordance with the print percentage.

This automatic print percentage judgement is made on the high speed printing mode and the high quality printing mode by the print percentage judgment means 5.

In this case, the number of dots in object is 96 dots (3-burn) in the case of the high speed printing. The number is 128 dots (2-burn) in the case of the high quality printing mode, If the print percentage in this number of dots should exceed a certain percentage (for example 75% in the case of high speed printing mode), the number of divisions of heating element 2 in the print blocks 3a through 3e is increased and the cycles of electrification are decreased.

The fractionization to be done at this time results in dropping the print speed, which promotes the diffusion of energy (heat) from the print head.

Figure 11:
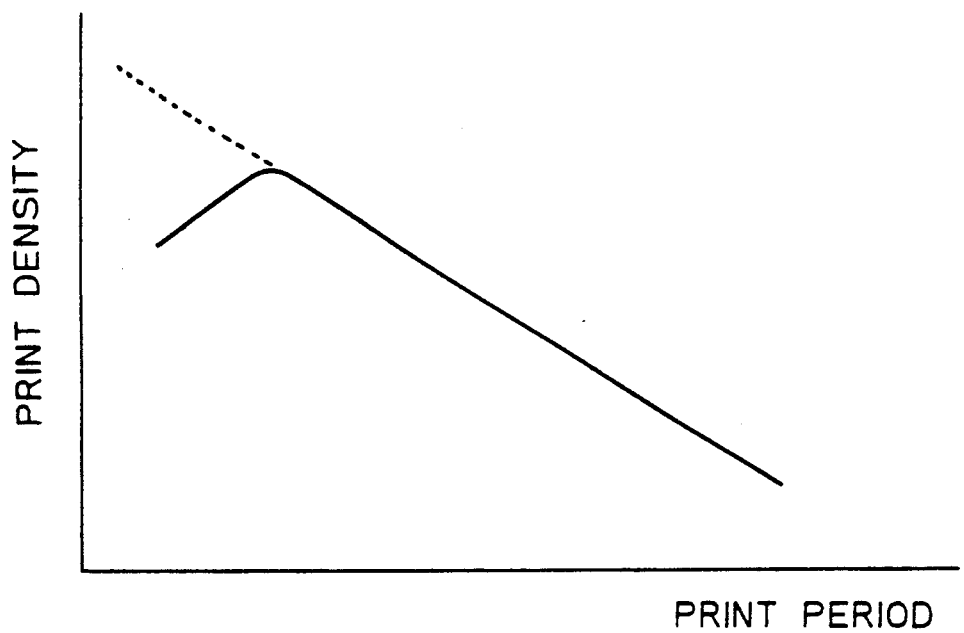
FIG. 11 is a diagram showing the relation between the print period and print density.

As shown in FIG. 11, if the print speed becomes slower, a greater energy "$\epsilon$" becomes necessary for obtaining the same temperature. That is to say, if the print speed is too high, the pulse width T becomes smaller and a sufficient energy cannot be obtained, while if the print speed is too slow, the density becomes lower, and a practical print speed cannot be obtained any longer if the pulse width T should be enlarged until completely coloring a single dot.

Therefore, by expressing the relation of this print percentage with the print speed in a form of a table and by changing the print speed and the preset value of print percentage on the basis of the table value in accordance with the printing mode and the paper quality of thermosensitive paper to be used, the stable print quality can coexisted with the higher speed.

In this way, the heating elements in a plurality of print blocks are heated simultaneously for printing the letters on the thermosensitive paper in this embodiment. That is to say, the printing can be made at a higher speed, for example, even with the drive at low voltage of around 5 V.

If the number of heating elements in the print blocks to be heated by the heating means should have exceeded the stipulated quantity, such printing troubles as the voltage drop by internal impedance and the loss inside the head due to the common conductors inside the head can be prevented by further subdividing the print blocks and heating them by the heating means.

Therefore, the printing troubles attributable to the voltage drop due to the internal impedance and the loss inside the drop by the common conductor inside the head can be prevented. Moreover, the printing can be made at a high speed even with the drive of low voltage of around 5 V.

For reference, the embodiment has been explained in the case of the print head with its total number being 320 dots having heating element, which has been subdivided into 5 print blocks at every 64 dots, but without being limited by this, the total number of heating elements and the number of subdivisions of a heating element into the print blocks owned by the print head are, needless to say, optional in accordance with the given equipment and purpose.

Next, the second embodiment of line thermal printer relating to the present invention is to be explained. Mention is to be made of the structure of a line thermal printer, which has been built so that it may have a plurality of printing modes according to the kinds of thermosensitive paper.

The basic structure of this embodiment is almost identical to the structure in FIG. 3 on the line thermal printer relating to the first embodiment. However, this embodiment utilizes the electrification control means 6, which is shown in FIG. 3. The electrification control means 6 in this embodiment is for controlling the electrification to the print head 1 by the heating means 4 and for deciding the cycle of electrifications to the print head 1 on the basis of a plurality of printing modes in accordance with the kinds of thermosensitive paper with the printing cycle being fixed, namely, with the feed of thermosensitive paper being stopped. However, in the present embodiment, the print head 1 may comprise a plurality of print blocks 3a through 33 by collecting the heating elements 2 at the stipulated quantity for their blocking, and it may also be structured for selecting a plurality of print blocks out of the respective blocks for their electrification at the same time as shown in FIG. 3.

Further, as earlier mentioned, the energy required for the printing is $$\epsilon = \frac{(V - V_S)^2}{R} \cdot t/S$$

which sets the pulse width to a smaller value because of various conditions as described above, but the print energy "$\epsilon$" has been set to a great value by conducting the electrification plural times.

For example, the present embodiment has been set so that the impressed voltage is 4.8 V, the heating element resistance value is 45 $\Omega +/- 10\%$ and the heating element area S is W 0.165 mm $\times$ H 0.165 mm for 1-ply label paper and W 0.165 mm $\times$ H 0.165 mm or W 0.165 mm $\times$ H 0.330 mm for 2-ply paper with the head resolution being 6/mm. This is substantially the same conditions as those of the 1st pattern.

In addition, since the print speed is not to be sacrificed, it is possible to structure this embodiment to heat the heating elements 2 simultaneously in a plurality of print blocks 3a through 3e by use of the heating means 4.

Next, the action is to be described.

Figure 20:
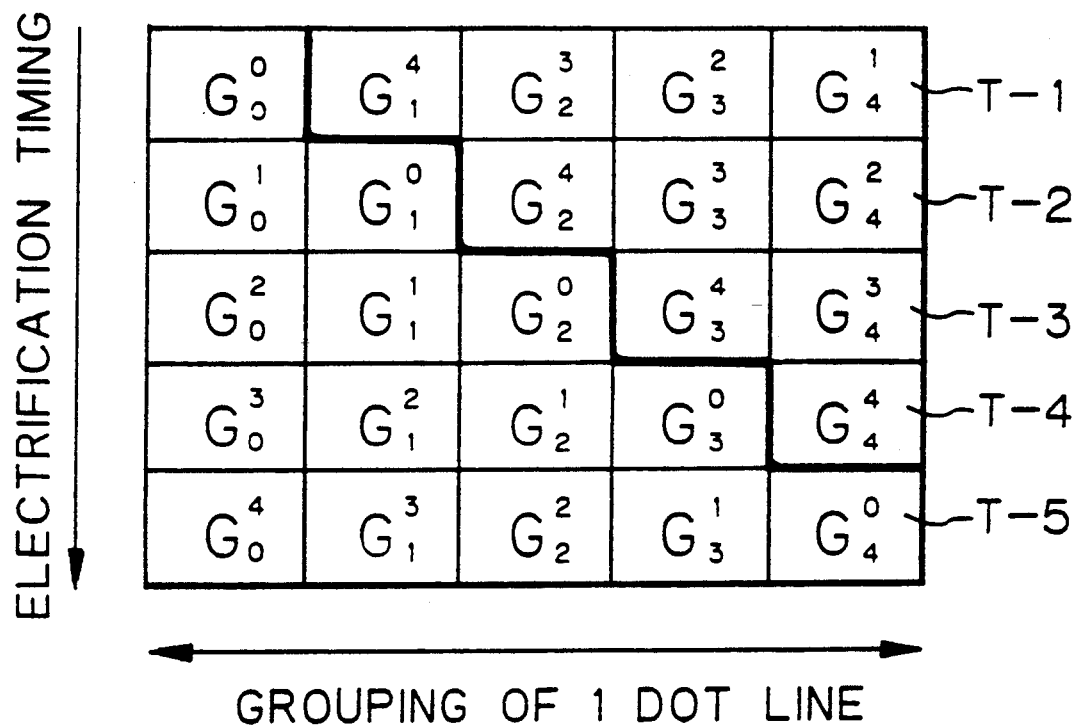
FIG. 20 is a diagram showing the usual electrification timing in the present invention.

The line thermal printer of this embodiment is equipped with 2 kinds of modes, which are
a) 1-ply printing mode, and
b) 2-ply printing mode,
and its electrification timing is as shown in FIG. 20.

Moreover, the "a" in $G_{b/a}$ stands for a group and the "b" for an electrification timing. The area enclosed by a thick line frame denotes the electrification timing of a previous dot line.

For example, the group of ($G_{0/0}$, $G_{4/1}$, $G_{3/2}$, $G_{2/3}$, $G_{1/4}$) means that the first electrification of Group 0, the fifth electrification of Group 1, the 4th electrification of Group 2, the third electrification of Group 3 and the second electrification of Group 4 of the current line are to be made at the same time.

The cycles of "b" are to be determined in accordance with the capacity of the power source. That is to say:

a) In the 1-ply printing mode, if the print energy $\epsilon$ at a time is small as in the 1-ply thermosensitive paper, 2 electrification cycles are determined, for example, by the electrification control means 6 as shown in FIG. 21. The numeral 0 in the figure 21 means the state of no electrification. If the simultaneous electrification is to be done at 2 groups (2 print blocks) as shown in FIG. 21, such a case can be imagined that the number of dots in object of electrification increases and the print percentage goes up depending on the data to be printed.

At that time, the number of data to be printed at lump is reduced and the print period "t" is enlarged if the print percentage becomes higher than the stipulated value by the print percentage judgement means 5. However, since the judgement is made in the unit of respective print blocks 3a through 3e in the print percentage judgement means 5, the printing can be made without any fall in the executed print speed.

b) In the 2-ply printing mode, if a higher print energy $\epsilon$ is required as it is so in the 2-ply thermosensitive paper in comparison with the 1-ply thermosensitive paper, the realization of a higher speed is attempted with 2-dot line as a single heating line.

If the 2-dot line should be used as a single heating line, the resolution in feed direction of thermosensitive paper falls compared with that in the 1-ply printing mode. A gas appears between the previous dot line and the subsequent dot line, but because the print energy $\epsilon$ becomes larger, the printed dot becomes larger than in the 1-ply printing mode, and is sufficiently practicle. The printing speed is preferred in this embodiment. In this case, a high quality print can be obtained by lowering the speed if the quality is required.

Figure 22:
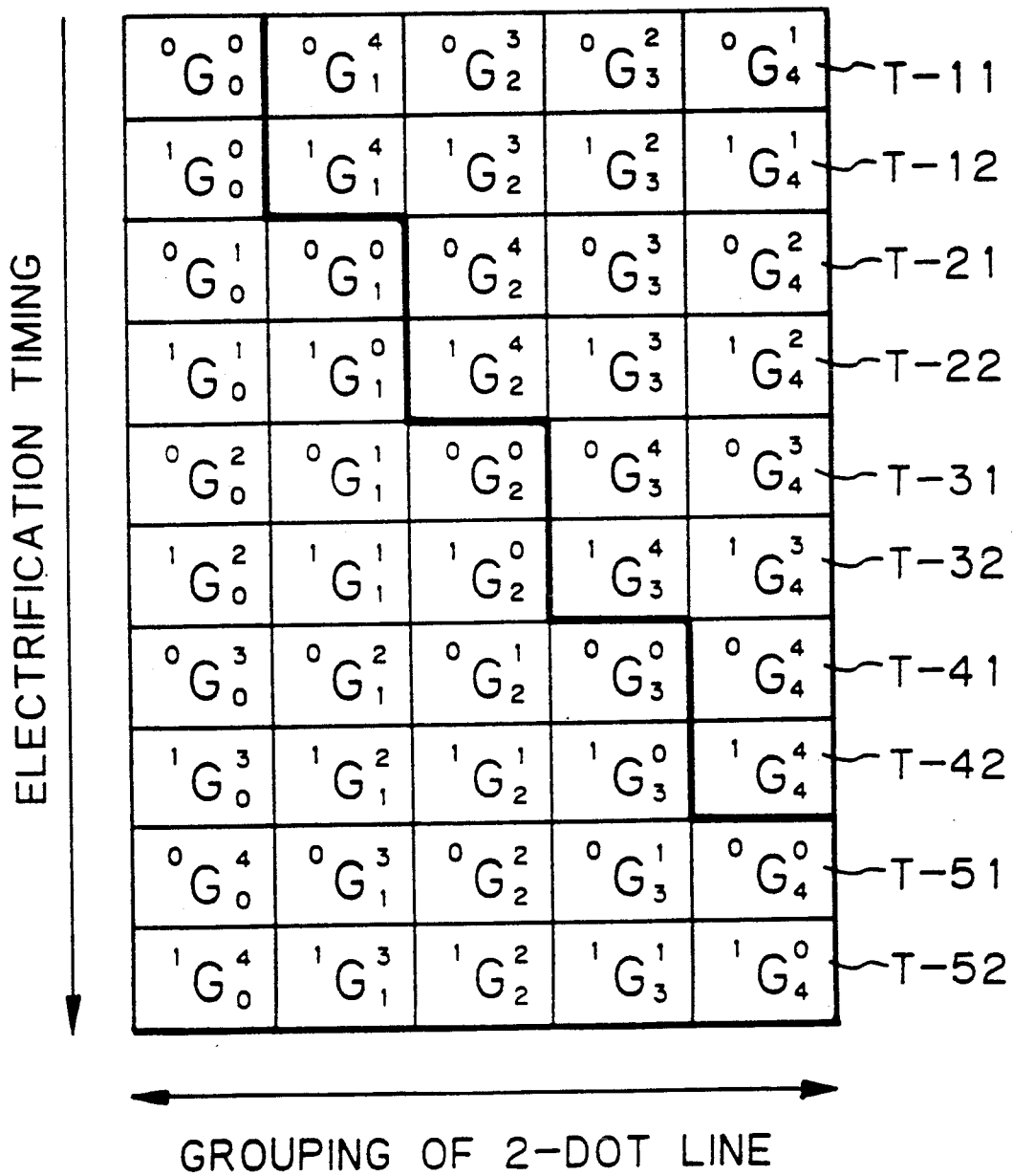
FIG. 22 is a diagram showing the electrification timing during 2-ply printing mode in the present invention.

As mentioned earlier the 2-ply printing mode requires a higher print energy $\epsilon$ compared with the 1-ply printing mode, and it becomes the electrification pattern as shown in FIG. 22.

For example, "a" of $^cG_{b/a}$ in the figure represents the group, "b" the electrification timing, "c" the timing in the case that the electrification timing has been doubled, while the area enclosed by a thick line frame stands for the electrification timing of the previous dot line.

Therefore, since the electrification control as shown in FIG. 22 is conducted, the print pulse width "t" in the below mentioned formula is doubled.

$$\epsilon = \frac{(V - V_S)^2}{R} \cdot t/S$$

but the print energy "$\epsilon$" is doubled, while the fall in print speed is being reduced.

For example, if 2 sheets of thermosensitive paper should be printed in overlap, the print energy is accordingly required compared with the printing of 1 sheet, and for the need of increasing the energy given to the respective heating elements 2. The embodiment in question is for solving the type of problem by increasing the cycles of electrification.

An additional electrification is given to the usual electrification pulse generation point of time T-11 as shown in FIG. 22, and its electrification pulse generation point of time is indicated as T-12.

Similarly, the additional electrification is done at the electrification pulse generation point of time T-n2 against each electrification pulse generation point of time T-n1.

The electrification time in this type of additional electrification is not to be especially limited, but is appropriately determined by the kind, the number of sheets of thermosensitive paper, the print speed, etc.

For example, suppose the usual electrification time 1 as in the case that there are 2 thermosensitive sheets of paper. In this case, ratio of applicable additional electrification time can be made to be 0.5.

As described above, it is desirable in the embodiment in FIG. 22 to make the print data to the heating element 2 processed by the usual electrification pulse to be identical to the print data to the heating element 2 processed by the additional electrification pulse.

On the other hand, if the print energy should be increased simply against the print block, the region to be colored in the printed sheet is enlarged, and hence the probability for it to overlap with the other print data becomes greater, which leads to a decrease in the resolution.

For this reason, the present embodiment also uses the print percentage judgement means 6 if the usual electrification processing or the additional electrification is being connected in the print percentage of each heating element 2 in a single piece of print block has exceeded the stipulated value, for example 50%, the electrification time against each block in 1 line can further be subdivided.

This case can be made possible if 1 line comprises of 16 bits.

The electrification dots of 1 print line are to be electrified in division at every 1 dot in the doubledensity mode.

In other words, the printing/coloring energy is proportional to the square of impressed voltage as described above.

Further, since an internal resistor exists in a power source such as a battery, the drop in voltage is caused if there is an excessive current.

Therefore, even if the voltage should be applied to the same electrification time, there appears the situation that the coloring energy at every dot fluctuates and has an influence on the print quality depending on the type of load.

The line thermal printer relating to the present invention adopts the system for dividing the print block in order to avert this problematic point, and the method counts the number of electrification dots inside the block in object of electrification as shown in the above, and divides the print block in accordance with the number of the dots that have been counted to decide the division of $\frac{1}{2}$ or the division of $\frac{1}{4}$.

If the division electrification inside the print block in object has been completed, the print block in object is shifted to the next print block for carrying out a similar actuation.

In this case, the threshold value of the number of dots for deciding the division electrification varies with the current capacity of the power source (battery) to be used.

If the print percentage is low, the data inside a single print block can be printed at a time without any division.

If the print percentage is slightly high, it may be acceptable to use the method for dividing the dots inside a print block in terms of software within the print block and for printing the data with the time being deviated sequentially.

If the print percentage is very high, the total dots inside a print block shall be divided into $\frac{1}{4}$ in terms of software from one end, for printing the data sequentially.

In this way, the present embodiment can control the current load against the battery and can obtain a stable print quality by changing the division percentage of print data for printing the data on the basis of print percentage.

The optimum printing is done in accordance with each application by the 2 actuation modes, and the stabilization of print quality can be attempted through decreasing the influence of voltage drop due to the impedance inside the battery by the print percentage judgement means 5.

In this way, according to the present embodiment, the electrification to the print head can be controlled with the print period fixed by use of the electrification control means, the cycle of electrification to the print head can be determined on the basis of a plurality of printing modes according to the kinds of thermosensible papers, thus being able to change the print energy per unit area.

Therefore, the fall in printing speed can be prevented even in the drive with a low voltage, for example, of around 4.8 V, and a favorable print quality can be obtained against various types of thermosensitive paper.

Further, since generally the print density goes up in accordance with the print energy in thermosensitive paper, the data can be printed out in dense/thin gradation by controlling the cycles of electrification as found in the present embodiment.

In addition, the embodiment quotes an example of the print head of 320 dots in total number, which has a heating element divided into 5 print blocks at every 64 dots, but without being limited only to this case, it is apparent that the total number of heating elements associated with the print head and the number of divisions of the heating element into print blocks are optional in accordance with the given equipment and purpose.

Furthermore, the cycles of electrification can be determined freely without being limited to the embodiment.

The line thermal printer relating to this invention is for receiving the print data inclusive of the stipulated character code, etc., which has been input from an appropriate input means with the computer 13, which has a central processing means, and for printing the font data corresponding to the applicable character stored inside the computer 13 onto the printing sheet. However, the printing of high resolution has become possible following the enhancement in recent manufacturing techniques of the thermal line head.

For this reason, it has become possible to easily change the letter size of reduction letters, double square letters, etc.

In the present invention, the standard letter size has been programmed to be printed by extending one dot 2 times in vertical×2 times in horizontal directions as explained above.

Under this kind of situation, the printing is made without any reduction processing after the extension conversion has been executed in the high quality printing mode (HQ). In this case, the print percentage tends to become higher than the print percentage prior to the extension conversion.

In contrast to this, the high speed printing mode (HS) executes the reduction processing (thinning out the print dots) in vertical and horizontal directions after the extension conversion for reducing the actual print percentage.

Since the print percentage is not high in the high speed printing mode (HS), the print speed can become higher because the print percentage in each divided block in the print block is frequently falling under the threshold value of the print percentage judgement compared with the print percentage in a high quality printing mode (HQ).

However, the print density becomes thinner as a whole because the number of print dots decreases.

Figure 23A:
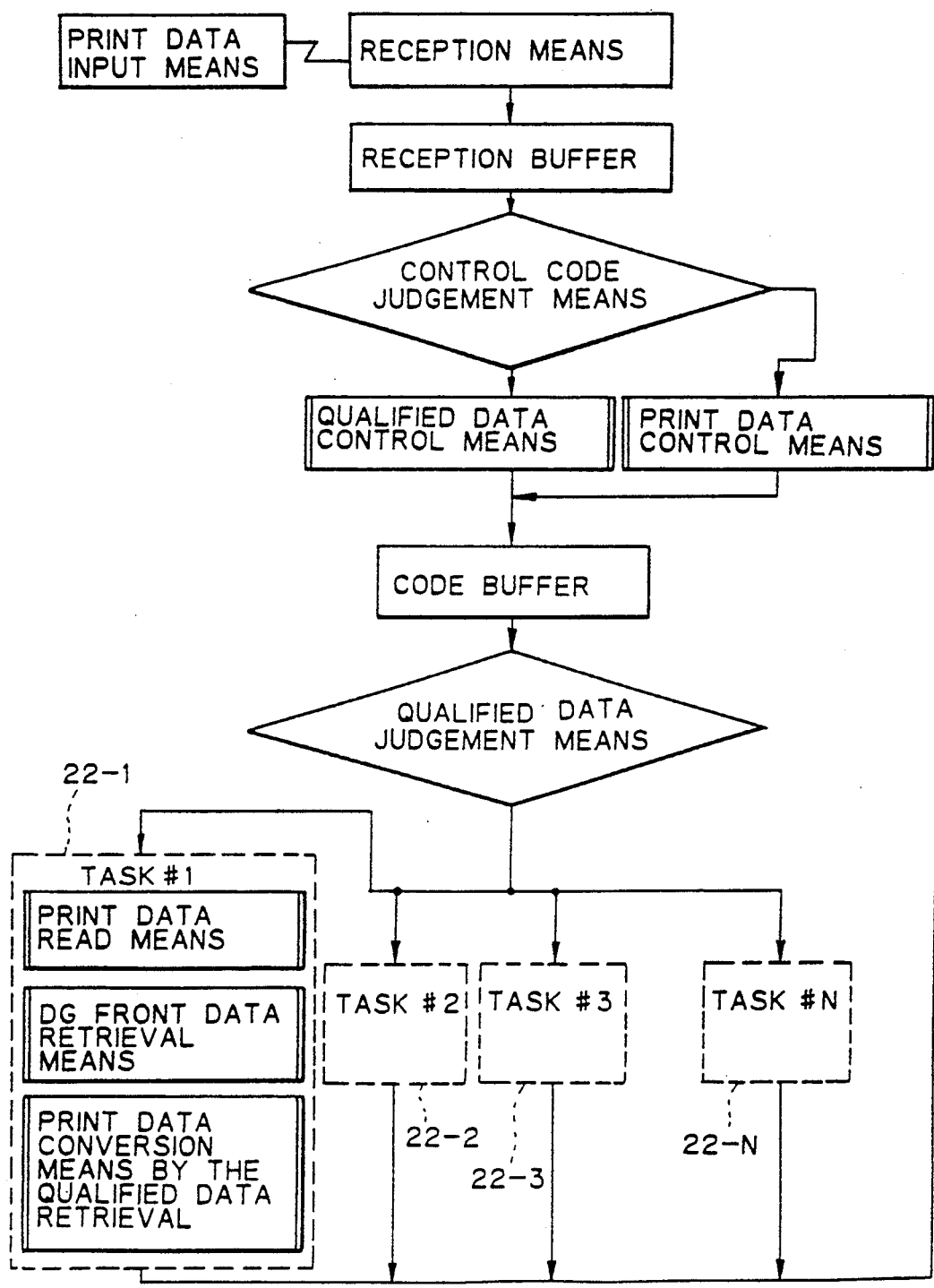

Finally, the control method of print control of the line thermal printer relating to the present invention is to be explained in accordance with the block diagram of FIG. 23.

In Step (1), the data of 1 line portion inside the stipulated print data to be printed is first input into the reception means of a computer which is a central processing means from an appropriate input means 14, and the print data is taken into a reception buffer 15. (Step (2)).

Next, at Step (3), the respective plural input data, of print data which have been input by a data analysis means 16 are analyzed. The control code having the print data judges (Step (4)) such information as print mode and the like through the use of the qualified data processing means comprising flag register 17 and so forth and stores the qualified data into the qualified data buffers (20-1 through 20-N) corresponding respectively to the input data of code buffer 19.

On the other hand, in Step (3), the print data owned by the print data are separated and processed adequately by the print data, control means (Step (5)), and the code data which are the result thereof are stored into the respective corresponding code data buffers (21-1 through 21-N) of applicable input data in the code buffer 19 via the data block 18. (Step (6)).

The code buffer or print data of 1 line portion to be printed is completed by the Step (6).

Next, the qualified data is first read out on each of these data in this type of code buffer 19 to make a judgement and determine, which type of print mode code is owned (Step (7)).

Based on the result, the stipulated task unit (for example, Task Unit #1) 22-1 is selected from the task table 22.

Thereafter, the qualified data and code data of stipulated data, which are stored in the code buffer 19, are transferred to the said selected task unit #1 (Step (8)), and read out from the stipulated print data from the applicable CG font table 24 in accordance with the code address associated with the code data using the print data read means 81. The CG font data retrieval means 82, which are incorporated into the task unit #1, determines the printing mode and finally converts into the stipulated form the print data using the print data conversion means 83, which have been retrieved by use of the printing mode program based on the qualified data retrieval.

At Step (9), the print data, which have been converted in the task unit, are transferred into an image buffer 25. The print data, which have been converted on each of these print data, are to be stored into the stipulated buffer positions.

At Step (10), the number of heating elements 2 being electrified on the basis of print data inside the said image buffer 25 is operated and the print percentage is calculated for every print block.

If the print percentage is larger than the stipulated threshold value, the analysis proceeds to (11), and the print data are to be further subdivided inside the print block.

Further, if the print percentage is smaller than the stipulated threshold value at Step (10), the step proceeds to Step (12) without passing through the said Step (11).

At Step (12), the cycles of electrification time are determined in accordance with the printing mode being decided by the kind, number, etc. of thermosensitive paper.

At Step (13), the print data, which have been processed at Step (12) are transferred to the print head 1 by the print head data transfer means contained in the print block control means 12.

The print head comprises the latch circuits 201 through 20n, which have been connected respectively to a plurality of heating elements 2 and the flip flops 101 through 10n connected to the latch circuits. The heating elements 2 are also driven by the heating means included in the print block control means 12 by the respective drive circuits 301 through 30n.

In the Step (13), the latch control signals inside the print data are supplied to the latch circuits, and the serial data transmission signals are supplied to the flip flop circuits.

The print speed, print voltage, print temperature, print percentage, printing mode and kind and number of thermosensitive paper is judged from the print data at Step (14), the drive conditions of electrification time control means is operated at Step (15) on the basis of the result, and the heating means included in the print block control means 12 is driven on the basis of the output of the said Step (15) at Step (16) for individually driving the stipulated heating elements 2.

The stipulated data is output from the print paper transfer means 11 on the basis of the print data, for driving the motor to transfer the sheets to be printed and for turning by the stipulated angle the platen roller 8, which is the printed sheet transferring means to move the print sheet the stipulated distance.

In this invention, the heating elements in a plurality of print blocks are heated at the same time for printing the data on the thermosensitive paper. The printing can be made at a high speed even with the drive at low voltage, for example, of around 5 V.

Further, if the number of heating elements in the print block to be heated by the heating means should exceed the stipulated quantity, the print block is further subdivided into several blocks for heating by the heating means, thereby capable of preventing printing problems such as voltage drop due to internal impedance and the loss inside the head coming from the common conductor inside the head.

Therefore, the printing problems attributable to the voltage drop due to internal impedance and to the loss inside the head coming from the common conductor inside the head can be prevented. Moreover, the data can be printed at a high speed with the drive at a low voltage of around 5 V.

The present invention can control the electrification to the print head with the print period being fixed by the electrification control means, determine the cycles of electrification to the print head on the basis of a plurality of printing modes in accordance with the kind of thermosensitive paper and change the printing energy per unit area.

Therefore, the drop in print speed can be prevented even with the drive at a low voltage, for example, of around 4.8 V, and a favorable print quality can be obtained against a variety of thermosensitive paper.

We claim:

1. A thermal printing apparatus for electrically heating a print head having a plurality of heating elements and for coloring and printing a thermosensitive paper in contact with said heating elements, comprising:

said thermal printing apparatus equipped with said print head including a plurality of print blocks that have subdivided said plurality of heating elements into a predetermined quantity;

heating means for electrically heating said heating elements for each of said plurality of print blocks based on print data received from a computing device through image buffers; and said heating means for simultaneously heating at least 2 print blocks, which have been selected out of said plurality of print blocks, wherein at least one of said selected print blocks includes a particular print block which was used for printing the thermosensitive paper in a previous printing operation just before a current printing operation.

2. A thermal printing apparatus as described in claim 1 wherein:

said thermal printing apparatus comprises a plurality of different printing modes;

said heating means for changing a number of said at least 2 print blocks to be heated, which have been selected; and a pattern of heating elements to be heated based on said print data in each of said print blocks.

3. A thermal printing apparatus as described in claim 2, wherein:

said thermal printing apparatus further comprises print percentage judgement means for judging a number of heating elements to be heated against all heating element units inside said particular print block among said at least 2 print blocks, which have been selected based on said print data; and said heating means further divides said particular print block into several heating units for heating if a number of heating elements to be heated according to said print percentage judgement means should have exceeded said predetermined print percentage.

4. A thermal printing apparatus as described in claim 5, wherein:

said thermal printing apparatus further comprises a plurality of printing modes and electrification control means for controlling electrification to be applied to said print head based on a fixed print period; and said electrification control means determines cycles of electrification to said print head based on a particular printing mode, which is selected from the plurality of printing modes based on said print data received from said computing device through said image buffers, and varies print energy per unit area.

5. A thermal printing apparatus as described in claim 2, wherein:

said thermal printing apparatus further comprises electrification control means for controlling electrification of said print head with a fixed print period; and said electrification control means determines number of cycles of electrification to be applied to said print head based on said printing mode, which is selected based on said print data received from said computing device through said image buffers, and varies print energy per unit area.

6. A thermal printing apparatus as described in claim 1 wherein:

print percentage judgement means for judging said number of heating elements to be heated against all the heating elements inside a single print block among said at least 2 print blocks, which have been selected based on said print data; and said heating means for further dividing said print block into several heating element units for heating if said number of heating elements to be heated, according to said print percentage judgement means, should have exceeded a predetermined print percentage.

7. A thermal printing apparatus as described in claim 6, wherein:

said thermal printing apparatus further comprises a plurality of printing modes and electrification control means for controlling electrification to be applied to said print head based on a fixed print period; and said electrification control means determines cycles of electrification to be applied to said print head based on a particular printing mode, which is selected from the plurality of printing modes based on said print data received from said computing device through said image buffers, and varies print energy per unit area.

8. A thermal printing apparatus as described in claim 1, wherein:

said thermal printing apparatus further comprises a plurality of printing modes and an electrification control means for controlling electrification to be applied to said print head with a fixed print period; and said electrification control means determines cycles of electrification to be applied to said print head based on a particular printing mode, which is selected from the plurality of printing modes based on said print data received from said computing device through said image buffers, and varies print energy per unit area.

9. The thermal printing apparatus of claim 1, wherein said image buffers comprise:

a first image buffer comprising current print data in a current printing line; and a second image buffer comprising previous print data.

10. The thermal printing apparatus of claim 9, wherein said heating means for simultaneously heating said at least two print blocks further comprises heating heating elements along one line based on said current print data from said first image buffer and said previous print data from said second image buffer.

11. A thermal printing apparatus for electrically heating a print head having a plurality of print blocks including a plurality of heating elements, and for coloring and printing a thermosensitive paper in contact with said heating elements of at least two print blocks comprising:

heating means for simultaneously electrically heating said heating elements of said at least two print blocks based on print data onto said print head, wherein at least one of said at least two print blocks includes a particular print block which was electrically heated in a previous printing operation just before a current printing operation;

a plurality of printing modes selected in accordance with varying kinds of said thermosensitive paper;

electrification control means for controlling electrification of said print head with a fixed print period; and said electrification control means determines a number of cycles of electrification to be applied to said print head based on a particular printing mode, which is selected from said plurality of printing modes based on said print data received from a computing device through image buffers, and varies print energy per unit area.

12. A thermal printing apparatus as described in claim 11, further comprising:

print percentage judgement means for judging a number of heating elements to be heated against a number of all heating elements in each of said print blocks based on said print data; and said heating means further comprises dividing each of said print blocks into several heating element units for heating if said number of said heating elements to be heated, according to said print percentage judgement means has exceeded a predetermined print percentage.

13. The thermal printing apparatus of claim 11, wherein said image buffers comprise:

a first image buffer comprising current print data in a current printing line; and a second image buffer comprising previous print data.

14. The thermal printing apparatus of claim 13, wherein said heating for simultaneously heating said at least two print blocks further comprises heating said heating elements along one line based on said current print data from said first image buffer and said previous print data from said second image buffer.

15. A thermal printing apparatus for printing on a thermosensitive paper in accordance with print data supplied thereto, comprising:

a print head having a plurality of print blocks of heating elements, each block comprising a plurality of respectively associated heating elements;

means for selectively, electrically heating each of said plurality of heating elements of each of said plurality of print blocks; and control means, responsive to the print data, for selectively controlling the heating means associated with respectively corresponding heating elements, for correspondingly heating and thereby enabling same to print corresponding data on the thermosensitive paper in contact therewith, said control means controlling simultaneously the heating means of at least two print blocks, selected out of the plurality of print blocks, where at least one of said selected print blocks includes a particular print block which was used for printing the thermosensitive paper in a previous printing operation just before a current printing operation.

* * * * *

UNITED STATES PATENT AND TRADEMARK OFFICE
CERTIFICATE OF CORRECTION

PATENT NO. : 5,319,390
DATED : June 7, 1994
INVENTOR(S) : WATANABE et al.

It is certified that error appears in the above-indentified patent and that said Letters Patent is hereby corrected as shown below:

Col. 1, line 9, delete "etc."; and change "a compact type" to --compact--;
line 34, after "paper" insert --,--;
line 35, delete "example of"; and after "example," insert --if--;
line 36, change "energies, are given" to --energies are given,--.

Col. 2, line 5, after "because" delete ",";
line 6, delete "a"; and after "and" insert --the--;
line 13, after "necessary" insert --power--;
line 43, change ""VS"" to --"$V_s$"--.

Col. 3, line 25, delete "and";
line 26, change "moreover," to --Moreover,--;
line 27, delete paragraph indention;
line 41, delete "said";
line 65, change "for" to --For--.

Col. 4, line 8, delete "said";
line 14, change "block area" to --blocks are--.

Col. 5, line 4, delete "and";
line 10, change "is" to --in--;
line 13, change "FIG." to --FIGS.--; and after "16(D)" insert --are--;
line 16, change "FIG. to --FIGS.--;
line 19, change "FIG. to --FIGS.--;
line 22, change "FIG. to --FIGS.--;
line 39, change "FIGS. to --FIG.--.

Col. 6, line 32, after "present invention: insert --comprises a--;
line 66, delete "as";
line 67, change "mode. High" to --mode, a high--;
line 68, change "mode, and the" to --mode. The--.

UNITED STATES PATENT AND TRADEMARK OFFICE
CERTIFICATE OF CORRECTION

PATENT NO. : 5,319,390
DATED : June 7, 1994
INVENTOR(S) : WATANABE et al.

It is certified that error appears in the above-indentified patent and that said Letters Patent is hereby corrected as shown below:

Col. 7,  line 13, delete "said";
line 24, delete "said";
line 26, delete "said";
line 30, change "data I" to --data 1--;
line 33, change "datal" to --data 1--;
line 26, delete "said".

Col. 8,  line 24, after "ber" insert --of--; and after "to" delete "of";
line 63, change "1st" to --first--.

Col. 9,  line 2, delete "when";
line 10, change "2nd" to --second--;
line 15, change "2nd" to --second--;
line 24, change "1st" to --first--;
line 36, change "33" to --3e--;
line 60, change "(60,$\beta$)" to --($\alpha,\beta$)--;
line 61, change "os" to --of--.

Col. 10, line 12, delete "said";
line 17, change "index-functionally. The" to --index-functionally, the--;
line 31, after "each" insert --in--;
line 37, change "ahead." to --ahead).--.

Col. 11, line 45, change "FIG. (D)" to --FIG. 16(D)--.

Col. 12, line 17, change ""$\epsilon$" much" to --"$\epsilon$" becomes much--.

Col. 13, line 21, change "coexisted" to --coexist--.

Col. 14, line 1, change "33" to --3e--;
line 25, change "1st" to --first--.

UNITED STATES PATENT AND TRADEMARK OFFICE
CERTIFICATE OF CORRECTION

PATENT NO. : 5,319,390
DATED : June 7, 1994
INVENTOR(S) : WATANABE et al.

It is certified that error appears in the above-indentified patent and that said Letters Patent is hereby corrected as shown below:

Col. 15, line 10, change "practicle" to --practical--.

Col. 16, line 6, delete "of";
line 68, change "thermosensible" to --thermosensitive--.

Col. 18, line 28, delete "said";
line 45, delete "said";
line 49, before "(11)" insert --Step--;
line 54, delete "the said".

Col. 19, line 14, delete "the said".

Col. 20, line 28 (Claim 4, line 2), change "5" to --3--.

Col. 22, line 48 (Claim 15, line 18), change "where" to --wherein--.

Signed and Sealed this

Twenty-sixth Day of May, 1998

Attest:

BRUCE LEHMAN

Attesting Officer

Commissioner of Patents and Trademarks